(12) United States Patent
Jo

(10) Patent No.: US 12,554,400 B2
(45) Date of Patent: Feb. 17, 2026

(54) METHOD OF OPERATING STORAGE DEVICE USING HOST REQUEST BYPASS AND STORAGE DEVICE PERFORMING THE SAME

(71) Applicant: Samsung Electronics Co., Ltd., Suwon-si (KR)

(72) Inventor: Yongchan Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 219 days.

(21) Appl. No.: 18/244,618

(22) Filed: Sep. 11, 2023

(65) Prior Publication Data
US 2024/0256130 A1 Aug. 1, 2024

(30) Foreign Application Priority Data
Jan. 31, 2023 (KR) .......................... 10-2023-0012358

(51) Int. Cl.
*G06F 3/06* (2006.01)

(52) U.S. Cl.
CPC .............. *G06F 3/061* (2013.01); *G06F 3/064* (2013.01); *G06F 3/0655* (2013.01); *G06F 3/0679* (2013.01)

(58) Field of Classification Search
CPC ...... G06F 3/0604; G06F 3/061; G06F 3/0611; G06F 3/064; G06F 3/0655; G06F 3/0656; G06F 3/0658; G06F 3/0659; G06F 3/0679; G06F 9/3004; G06F 12/0888; G06F 2212/1016
See application file for complete search history.

(56) References Cited

U.S. PATENT DOCUMENTS

| | | |
|---|---|---|
| 9,921,908 B2 | 3/2018 | Yum et al. |
| 10,310,924 B2 | 6/2019 | Jei et al. |
| 10,579,286 B2 | 3/2020 | Oh et al. |
| 11,416,413 B1 | 8/2022 | Lercari et al. |
| 2018/0046377 A1* | 2/2018 | Camp ............... G06F 3/0604 |
| 2022/0083275 A1 | 3/2022 | Liu et al. |

FOREIGN PATENT DOCUMENTS

| | | |
|---|---|---|
| KR | 1020190054239 A | 5/2019 |
| KR | 102277521 B1 | 7/2021 |
| KR | 102435873 B1 | 8/2022 |

OTHER PUBLICATIONS

Jin Ae and Youpyo Hong, "Efficient Garbage Collection Algorithm for Low Latency SSD," Electronics 2022, 11, 1084.

* cited by examiner

*Primary Examiner* — Larry T Mackall
(74) *Attorney, Agent, or Firm* — Muir Patent Law, PLLC

(57) ABSTRACT

In a method of operating a storage device, the method receives a first data input/output (I/O) request for performing a first data I/O operation on a first memory block from a host device, where the first data I/O request includes an address of the first memory block. The method receives a parameter check table including a plurality of parameters from the buffer memory. By scheduling the first data I/O request using a first parameter corresponding to the address of the first memory block and the parameter check table, when the first parameter is equal to one of the plurality of parameters, the method transmits a first data I/O command to non-volatile memories, such that a first latency from a time at which the first data I/O request is received to a time at which the first data I/O command is transmitted becomes longer than a reference latency.

20 Claims, 17 Drawing Sheets

| IO_REQ1a | |
|---|---|
| ⋮ | ⋮ |
| ADDRESS | LA1 |
| ⋮ | ⋮ |

| IO_JD1a | |
|---|---|
| ⋮ | ⋮ |
| PARAMETER | PT1 |
| ⋮ | ⋮ |

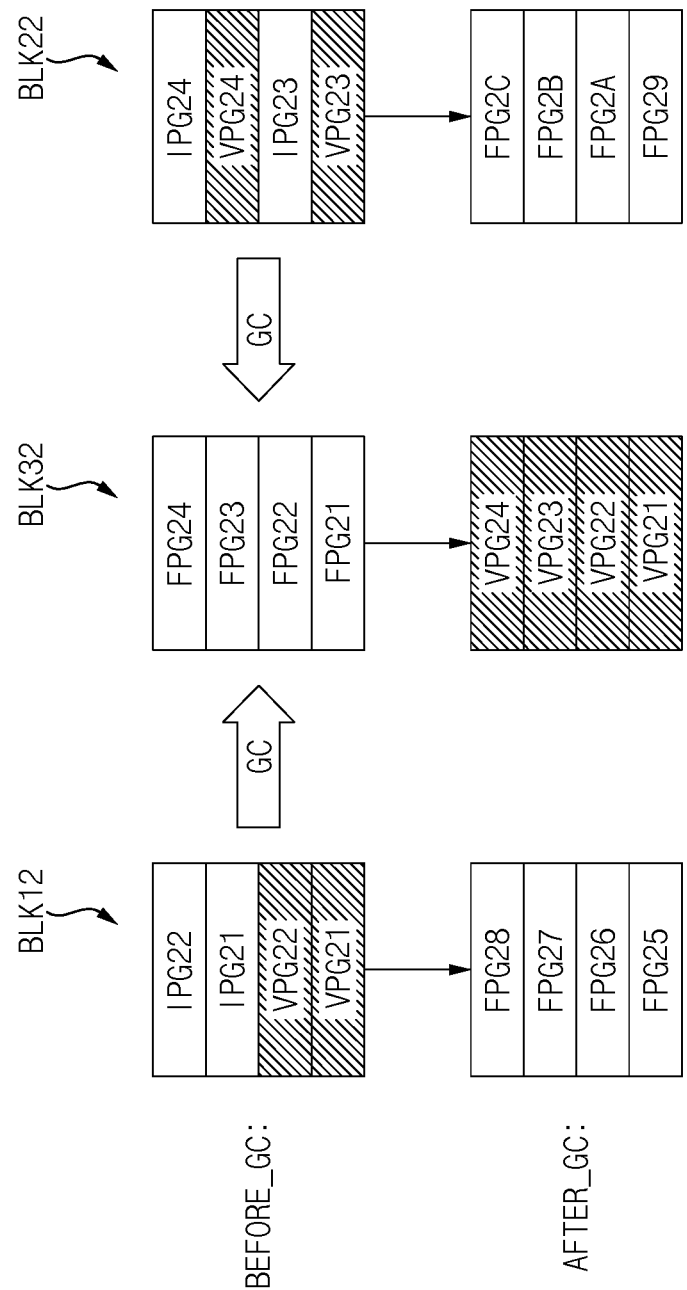

FIG. 11A

| IO_REQ1b | |
|---|---|
| ⋮ | ⋮ |
| ADDRESS | LA1 |
| GROUP ID INFORMATION | I1 |
| ⋮ | ⋮ |

FIG. 11B

| IO_JD1b | |
|---|---|
| ⋮ | ⋮ |
| PARAMETER | PT1 |
| SCHEDULING GROUP ID | ID1 |
| ⋮ | ⋮ |

| PARAMETER | SOURCE SCHEDULING GROUP ID | DESTINATION SCHEDULING GROUP ID |
|---|---|---|
| PTa | S_IDa | D_IDa |
| PTb | S_IDb | D_IDb |
| PTc | S_IDc | D_IDc |
| ⋮ | ⋮ | ⋮ |

METHOD OF OPERATING STORAGE DEVICE USING HOST REQUEST BYPASS AND STORAGE DEVICE PERFORMING THE SAME

REFERENCE TO PRIORITY APPLICATION

This application claims priority under 35 USC § 119 to Korean Patent Application No. 10-2023-0012358, filed Jan. 31, 2023, the content of which is hereby incorporated herein by reference in its entirety.

BACKGROUND

1. Technical Field

Example embodiments relate to integrated circuits, and more particularly, methods of operating storage devices using host request bypass, and storage devices performing the methods.

2. Description of the Related Art

Recently, storage devices such as solid state drives (SSD) using memory devices are widely used. The storage devices have advantages such as excellent stability and durability, and very fast information access speed and low power consumption because they do not have mechanical operation units. The storage devices are applied not only to electronic systems such as notebook computers, but also to various types of systems, such as automobiles, airplanes, and drones, storage devices, etc.

The storage devices operate based on a plurality of requests and/or commands received from host devices. Performance degradation of the storage devices may occur according to characteristics of I/O requests and/or commands to the storage devices. Thus, various methods for efficiently processing requests and/or commands from the host device are being studied.

SUMMARY

At least one example embodiment of the present disclosure provides a method of operating a storage device capable of efficiently processing requests from a host device by bypassing requests that cause performance degradation.

At least one example embodiment of the present disclosure provides a storage device performing the method.

According to example embodiments, in a method of operating a storage device including a plurality of non-volatile memories and a buffer memory, a first data input/output (I/O) request for performing a first data I/O operation is received from a host device located outside the storage device. The first data I/O request includes an address of a first memory block among a plurality of memory blocks included in the plurality of non-volatile memories. The first data I/O operation is performed on the first memory block. A parameter check table including a plurality of parameters is received from the buffer memory. A first data I/O command is transmitted to at least one of the plurality of non-volatile memories by scheduling the first data I/O request using a first parameter and the parameter check table, where the first data I/O command corresponds to the first data I/O request. The first parameter corresponds to the address of the first memory block. When the first parameter is equal to one of the plurality of parameters, a timing of transmitting the first data I/O command is controlled such that a first latency from a time at which the first data I/O request is received to a time at which the first data I/O command is transmitted becomes longer than a reference latency.

According to example embodiments, a storage device includes a storage controller, a plurality of non-volatile memories, a plurality of memory blocks and a buffer memory. The plurality of non-volatile memories include a plurality of memory blocks, and are controlled by the storage controller. The buffer memory stores a parameter check table including a plurality of parameters, and is controlled by the storage controller. The storage controller receives a first data I/O request for performing a first data I/O operation from a host device located outside the storage device, receives the parameter check table from the buffer memory, and transmits a first data I/O command to at least one of the plurality of non-volatile memories by scheduling the first data I/O request using a first parameter and the parameter check table. The first data I/O request includes an address of a first memory block among the plurality of memory blocks, the first data I/O operation is performed on the first memory block. The first data I/O command corresponding to the first data I/O request, the first parameter corresponding to the address of the first memory block. When the first parameter is equal to one of the plurality of parameters included in the parameter check table, a timing of transmitting the first data I/O command is controlled such that a first latency from a time at which the first data I/O request is received to a time at which the first data I/O command is transmitted becomes longer than a reference latency.

According to example embodiments, in a method of operating a storage device including a storage controller, a plurality of non-volatile memories and a buffer memory, and communicating with a host device located outside the storage device, a first data read request for performing a first data read operation from the host device is received by the storage controller. The first data read operation is performed on a first memory block among a plurality of memory blocks included in the plurality of non-volatile memories. A parameter check table is received from the buffer memory by the storage controller. A first data read command is transmitted by the storage controller to at least one of the plurality of non-volatile memories by scheduling the first data read request using the parameter check table, where the first data read command corresponds to the first data read request. The first data read request includes a logical address of the first memory block. A first read job descriptor generated based on the first data read request includes a first parameter corresponding to a physical block number (PBN) of the first memory block, and a first scheduling group identification (ID) corresponding to a first scheduling group among a plurality of scheduling groups. The parameter check table includes a plurality of parameters, a plurality of source scheduling group IDs corresponding to the plurality of parameters and a plurality of destination scheduling group IDs corresponding to the plurality of parameters. In transmitting the first data read command, the first read job descriptor is generated based on the first data read request. The first parameter included in the first read job descriptor is compared with the plurality of parameters included in the parameter check table. When a second parameter among the plurality of parameters has the same value as the first parameter, a scheduling operation on a second scheduling group ID corresponding to a destination scheduling group ID of a second parameter before a scheduling operation is performed on the first scheduling group ID. When a parameter having the same value as the first parameter does not exist in the plurality of parameters, the scheduling operation is performed on the first scheduling group ID immediately and outputs the first data read command based on a result of the scheduling operations. When the second parameter has the same value as the first parameter, an operation in which at least a part of first data stored in the first memory block is copied to a second memory block different from the first memory block among the plurality of memory blocks is being performed. When the second parameter has the same value as the first parameter, a timing of transmitting the first data read command is controlled such that execution of the first data read operation on the first memory block is delayed. The timing of transmitting the first data read command is controlled such that a first latency from a time at which the first data read request is received to a time at which the first data read command is transmitted becomes longer than a reference latency.

In the method of operating the storage device and the storage device according to example embodiments as described above, only requests causing performance degradation may be delayed and/or bypassed by using the parameter check table. For example, the parameter check table may include information on memory blocks in which a first operation (e.g., a reclaim operation) is being performed, and may compare a first parameter (e.g., a physical address) corresponding to an address of the first memory block (e.g., a logical address) included in the first data I/O request (e.g., a data read request) received from the host device with a plurality of parameters included in the parameter check table. When it is determined that the first operation on the first memory block is being performed, an execution of the first data I/O request on the first memory block may be delayed by scheduling the first data I/O request. By isolating separately only I/O requests on a specific memory block and scheduling, execution delay and bypassing the isolated I/O requests, requests from the host device may be efficiently processed, and performance degradation of the storage device may be prevented.

BRIEF DESCRIPTION OF THE DRAWINGS

Illustrative, non-limiting example embodiments will be more clearly understood from the following detailed description taken in conjunction with the accompanying drawings.

FIGS. 6A and 6B are diagrams illustrating examples of a first operation performed in a method of operating a storage device according to example embodiments.

FIGS. 11A, 11B, and 11C are diagrams illustrating examples of data I/O requests, I/O job descriptors, and parameter check tables used in a method of operating a storage device according to example embodiments.

DETAILED DESCRIPTION OF THE EMBODIMENTS

Figure 1:
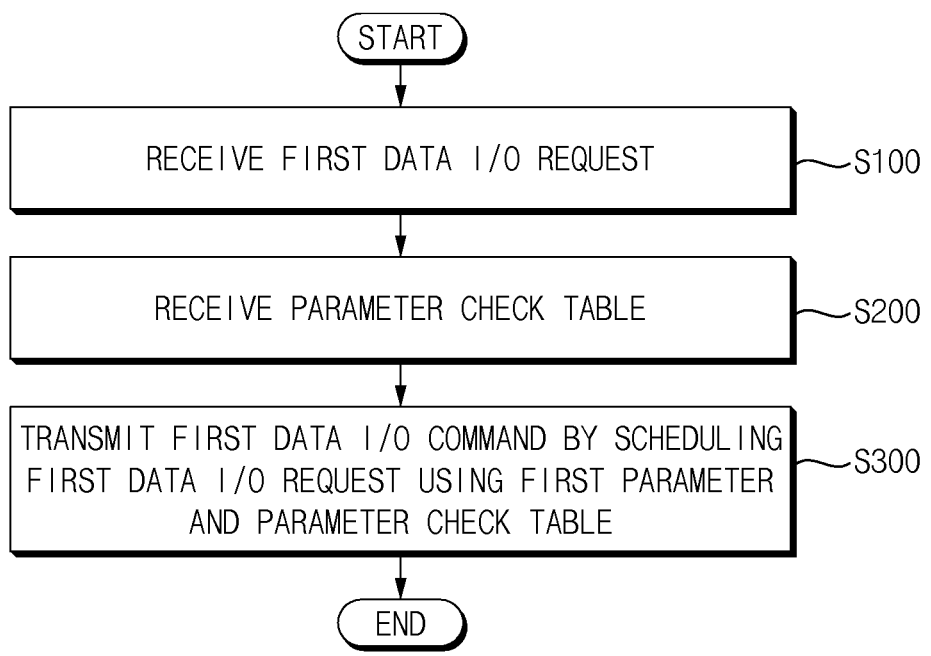
FIG. 1 is a flowchart illustrating a method of operating a storage device according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flowchart illustrating a method of operating a storage device according to example embodiments.

Referring to FIG. 1, a method of operating a storage device according to example embodiments is performed by a storage device that includes a storage controller, a plurality of non-volatile memories and a buffer memory. The storage device may operate based on requests received from a host device that is located outside the storage device. Configurations of the storage device and a storage system including the storage device will be described with reference to FIGS. 2 through 4.

In a method of operating a storage device according to example embodiments, a first data I/O request is received from outside of the storage device, e.g., from the host device (operation/block S100).

The first data I/O request is a request for performing a first data I/O operation on a first memory block among a plurality of memory blocks included in the plurality of non-volatile memories. For example, the first data I/O request may include an address of the first memory block. For example, the address of the first memory block included in the first data I/O request may be a logical address, and a first parameter indicating a physical address of the first memory block may be obtained based on the logical address. For example, the first data I/O request may further include information of generating a first scheduling group identification (ID), and the first scheduling group ID may correspond to the first parameter and indicate a first scheduling group among a plurality of scheduling groups. For example, a request received from the host device may be referred to as a host command, and a data I/O request may be referred to as a host I/O command.

In some example embodiments, the first data I/O operation may be a data read operation in which at least a part of first data stored in the first memory block is read. The first data I/O request may be a data read request associated with (or for) the first memory block. However, example embodiments are not limited thereto, and the first data I/O operation and the first data I/O request may be one of various other operations and requests. An exemplary configuration of the first data I/O request will be described with reference to FIGS. 5A and 11A.

A parameter check table is received from inside of the storage device, e.g., from the buffer memory (operation S200).

The parameter check table may be stored in the buffer memory. For example, the parameter check table may include a plurality of parameters. For example, the parameter check table may further include a plurality of source scheduling group IDs and a plurality of destination scheduling group IDs corresponding to the plurality of parameters. Similar to the first parameter, each of the plurality of parameters included in the parameter check table may indicate a physical address of each of the memory blocks. Also, similar to the first scheduling group ID, each of the plurality of source scheduling group IDs and the plurality of destination scheduling group IDs included in the parameter check table may indicate a scheduling group.

The parameter check table may include information of memory blocks in which a first operation is being performed among the plurality of memory blocks. For example, memory blocks corresponding to the plurality of parameters included in the parameter check table may indicate memory blocks in which the first operation is being performed. An exemplary configuration of the parameter check table will be described with reference to FIGS. 5C and 11C.

In some example embodiments, the first operation may be an operation in which at least a part of data stored in a specific memory block is copied to another memory block, e.g., a block copy operation. For example, the first operation may be a reclaim operation, which is performed when an error occurs on data stored in the specific memory block, e.g., when uncorrectable error correction code (UECC) does not occur but cell state and/or data state are deteriorated to store data so that it is necessary to move the data to another memory block. For example, the first operation may be a garbage collection (GC) operation performed to change the specific memory block into a free memory block. However, example embodiments are not limited thereto, and the first operation may be one of various other operations. An exemplary configuration of the first operation will be described with reference to FIGS. 6A and 6B.

A first data I/O command is transmitted to at least one of the plurality of non-volatile memories by scheduling the first data I/O command using the parameter check table and the first parameter corresponding to the address of the first memory block (operation S300). For example, a first I/O job descriptor including the first parameter may be generated based on the first data I/O request, and the first data I/O request may be scheduled based on the first I/O job descriptor. For example, the first I/O job descriptor may further include the first scheduling group ID. An exemplary configuration of the first I/O job descriptor will be described with reference to FIGS. 5B and 11B.

The first data I/O command corresponds to the first data I/O request and is transmitted to at least one of the plurality of non-volatile memories to perform the first data I/O operation. For example, the first data I/O command may be transmitted to a non-volatile memory including the first memory block. For example, a command transmitted to the non-volatile memory may be referred to as a memory command to be distinguished from the host command, and a data I/O command may be referred to as a memory I/O command.

In some example embodiments, when the first data I/O request is a data read request associated with the first memory block, the first I/O job descriptor may be a read job descriptor, and the first data I/O command may be a data read command associated with the first memory block. However, example embodiments are not limited thereto, and the first data I/O command may be one of various commands corresponding to the first data I/O request.

In some example embodiments, when the first parameter is equal to one of the plurality of parameters included in the parameter check table, this may indicate that the first operation is being performed on the first memory block. When the first parameter is equal to one of the plurality of parameters included in the parameter check table, it is necessary to delay an execution of the first data I/O operation so that the first operation is executed and completed with priority. Thus, by scheduling the first data I/O request, a timing of transmitting the first data I/O command may be controlled so that the execution of the first data I/O operation is delayed. For example, the timing of transmitting the first data I/O command may be controlled such that a first latency from a time at which the first data I/O request is received to a time at which the first data I/O command is transmitted becomes longer than a reference latency.

In some example embodiments, when the first operation and the first data I/O operation are a block copy operation (e.g., a reclaim operation) and a data read operation, respectively, a read count threshold value (or read margin) may be set to a positive integer value at the start point (or trigger point) of the block copy operation on the first memory block. Thereafter, whenever a data read operation is performed on the first memory block, the read count threshold value may decrease by 1, and the block copy operation should be completed before the read count threshold value becomes 0. In other words, when the first operation is being performed on the first memory block, the first data I/O operation may be performed if the read count threshold value set on the first memory block is greater than 0, and the first data I/O operation may not be performed if the read count threshold value set on the first memory block is 0.

In some example embodiments, when the first parameter is different from all of the plurality of parameters included in the parameter check table, this may indicate that the first operation is not being performed on the first memory block. When the first parameter is different from all of the plurality of parameters included in the parameter check table, there is no need to delay the execution of the first data I/O operation. Thus, by scheduling the first data I/O request, the timing of transmitting the first data I/O command may be controlled so that the first data I/O operation is executed immediately and/or as quickly as possible. For example, the timing of transmitting the first data I/O command may be controlled such that the first latency is shorter than the reference latency.

An exemplary configuration of operation S300 will be described with reference to FIGS. 7 to 13.

In some example embodiments, when the first operation is started or when the first operation is completed on a specific memory block, the parameter check table may be updated, which will be described with reference to FIG. 14.

As described above, when the reclaim operation is performed on the specific memory block, the read count threshold value, which indicates the number of allowable read operations from a time point at which the reclaim operation is triggered to a time point at which the reclaim operation is completed, may be set and used. The reclaim operation on the specific memory block should be completed before the read count threshold value becomes zero. If the read count threshold value becomes 0, the read operation may not be normally performed, and stored data may be lost. Conventionally, when the read count threshold value becomes 0, all read operations were blocked and the reclaim operation was performed and completed before the all read operations, and there was a problem in that an overall performance of the storage device was greatly deteriorated.

In a method of operating a storage device according to example embodiments, only requests causing performance degradation may be delayed and/or bypassed using the parameter check table. For example, the parameter check table may include information of memory blocks in which the first operation (e.g., a reclaim operation) is being performed, and may compare the first parameter (e.g., a physical address) corresponding to the address (e.g., a logical address) of the first memory block included in the first data I/O request (e.g., a data read request) received from the host device with the plurality of parameters included in the parameter check table. When it is determined that the first operation on the first memory block is being performed, an execution of the first data I/O request on the first memory block may be delayed by scheduling the first data I/O request. For example, only I/O requests on the specific memory block may be separately and independently scheduled, delayed and bypassed. Accordingly, requests from the host device may be efficiently processed, and performance degradation of the storage device may be prevented.

For example, only read requests issued on a memory block in which the reclaim operation is triggered may be separately and independently scheduled, delayed and bypassed. Thus, the read count threshold value may relatively slowly decrease, and the reclaim operation may be efficiently performed. As a result, performance degradation of the storage device may be prevented because there is no need to block all read operations and perform and complete a reclaim operation before the all read operations.

Figure 2:
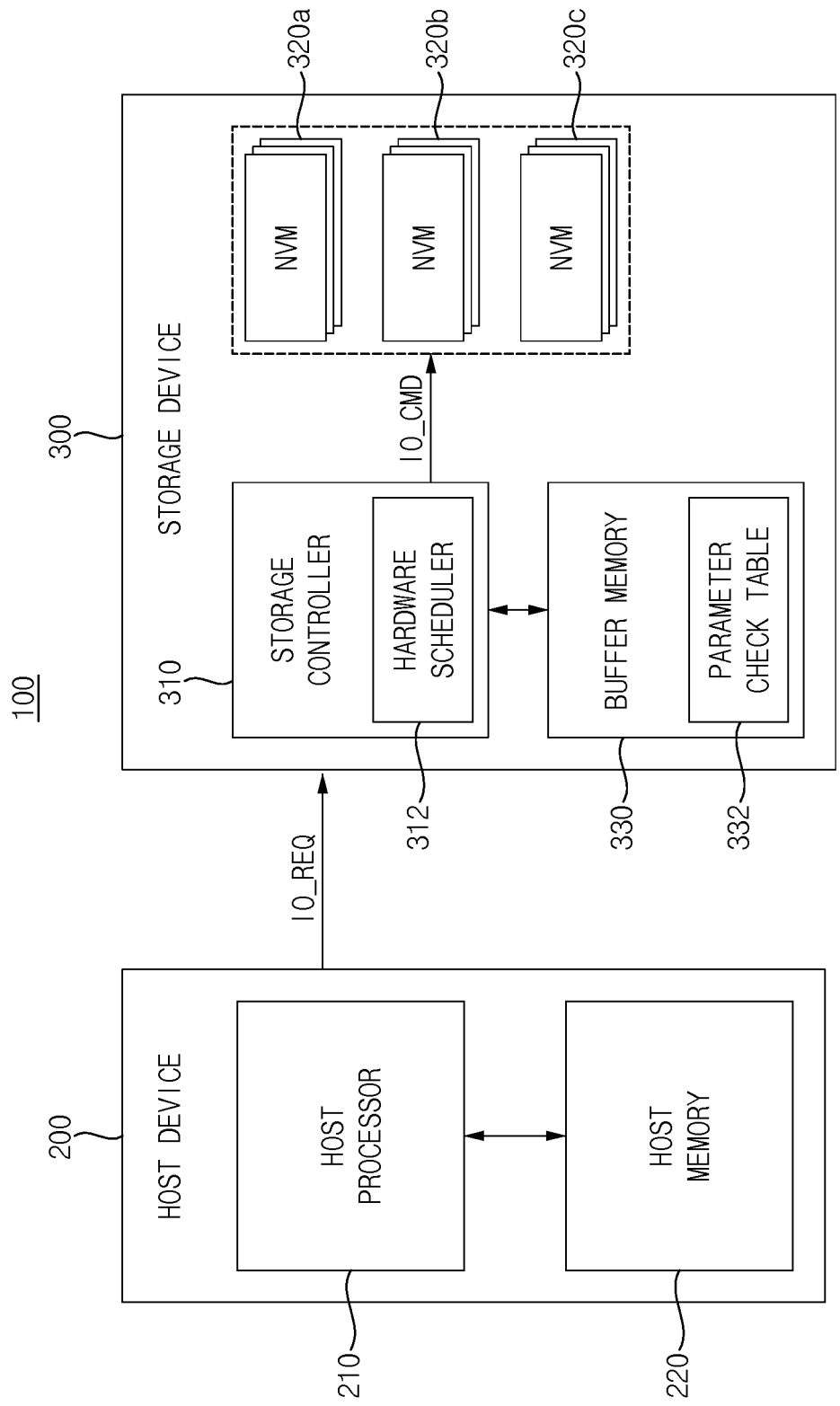
FIG. 2 is a block diagram illustrating a storage device and a storage system including a storage device according to example embodiments.

FIG. 2 is a block diagram illustrating a storage device and a storage system including a storage device according to example embodiments.

Referring to FIG. 2, a storage system 100 includes a host device 200 and a storage device 300.

The host device 200 controls overall operations of the storage system 100. The host device 200 may include a host processor 210 and a host memory 220.

The host processor 210 may control operations of the host device 200. For example, the host processor 210 may include an operating system (OS). For example, the operating system may include a file system for file management and a device driver for controlling peripheral devices including the storage device 300 at the operating system level. The host memory 220 may store instructions and data executed and processed by the host processor 210.

The storage device 300 is accessed by the host device 200. The storage device 300 may include a storage controller 310, a plurality of non-volatile memories 320a, 320b and 320c, and a buffer memory 330.

The storage controller 310 may control operations of the storage device 300. For example, the storage controller 310 may control an operation (e.g., a read operation) of the storage device 300 based on a data I/O request IO_REQ (e.g., a read request) received from the host device 200, and may control an exchange of data (e.g., a transmission of read data) between the host device 200 and the storage device 300. For example, the storage controller 310 may generate a data I/O command IO_CMD (e.g., a read command) for controlling an operation (e.g., a read operation) of the plurality of non-volatile memories 320a to 320c, may transmit the IO_CMD to the plurality of non-volatile memories 320a to 320c, and may control the exchange of data (e.g., a reception of read data) with the plurality of non-volatile memories 320a to 320c.

The plurality of non-volatile memories 320a to 320c may be controlled by the storage controller 310, and may store a plurality of data. For example, the plurality of non-volatile memories 320a to 320c may store meta data, various user data, or the like.

In some example embodiments, each of the plurality of nonvolatile memories 320a to 320c may include a NAND flash memory. In some example embodiments, each of the plurality of non-volatile memories 320a to 320c may include electrically erasable programmable read-only memory (EEPROM), phase change random access memory (PRAM), resistance random access memory (RRAM), and nano floating memory (NFGM). gate memory), polymer random access memory (PoRAM), magnetic random access memory (MRAM), ferroelectric random access memory (FRAM), and the like.

The buffer memory 330 may store instructions and data executed and processed by the storage controller 310, and may temporarily store data stored or desired to be stored in the plurality of non-volatile memories 320a to 320c. For example, the buffer memory 330 may include volatile memory such as static random access memory (SRAM) and dynamic random access memory (DRAM).

The storage controller 310 may include a hardware scheduler 312 to perform a method of operating a storage device according to example embodiments described above with reference to FIG. 1. The buffer memory 330 may store a parameter check table 332 to perform a method of operating a storage device according to example embodiments described above with reference to FIG. 1.

The storage controller 310 may receive a first data I/O request for performing a first data read operation from the host device 200 and may receive the parameter check table 332 including the plurality of parameters from the buffer memory 330. The first data I/O request may include an address of a first memory block. The hardware scheduler 312 may compare a first parameter corresponding to the address of the first memory block with the plurality of parameters, and may transmit a first data I/O command corresponding to the first data I/O request to at least one of the plurality of non-volatile memories 320a to 320c by scheduling the first data I/O request based on the comparison result. For example, when the first parameter is equal to one of the plurality of parameters included in the parameter check table 332, a timing of transmitting the first data I/O command is controlled such that a first latency from a time at which the first data I/O request is received to a time at which the first data I/O command is transmitted becomes longer than a reference latency. In some example embodiments, the reference latency may include a reference write latency In some example embodiments, the reference latency may include a reference read latency.

The storage controller 310 may perform a method of operating a storage device according to example embodiments, which will be described with reference to FIG. 14.

In some example embodiments, the parameter check table 332 may be stored in the storage controller 310 or may be stored in one of the plurality of non-volatile memories 320a to 320c when power supplied to the storage device 300 is blocked.

In some example embodiments, the storage device 300 may be a solid state drive (SSD), universal flash storage (UFS), multi-media card (MMC), or embedded MMC (eMMC). In some example embodiments, the storage device 300 may be a Secure Digital (SD) card, a micro SD card, a memory stick, a chip card, a Universal Serial Bus (USB) card, a smart card, a Compact Flash (CF) card, or the like.

In some example embodiments, the storage device 300 may be connected to the host device 200 via a block accessible interface which may include, for example, and Advanced Technology Attachment (ATA) bus, a Serial ATA (SATA) bus, a Parallel ATA (PATA) bus, a Small Computer Small Interface (SCSI) bus, a Serial Attached SCSI (SAS) bus, a Peripheral Component Interconnect express (PCIe) bus, a Non-Volatile Memory express (NVMe) bus, a UFS, an eMMC, a Compute eXpress Link (CXL) bus, or the like. The storage device 300 may use a block accessible address space corresponding to an access size of the plurality of nonvolatile memories 320a to 320c to provide the block accessible interface to the host device 200, for allowing the access by units of a memory block with respect to data stored in the plurality of nonvolatile memories 320a to 320c.

In some example embodiments, the storage system 100 may be any computing system, such as a personal computer (PC), a server computer, a data center, a workstation, a digital television, a set-top box, a navigation system, etc. In other example embodiments, the storage system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

Figure 3:
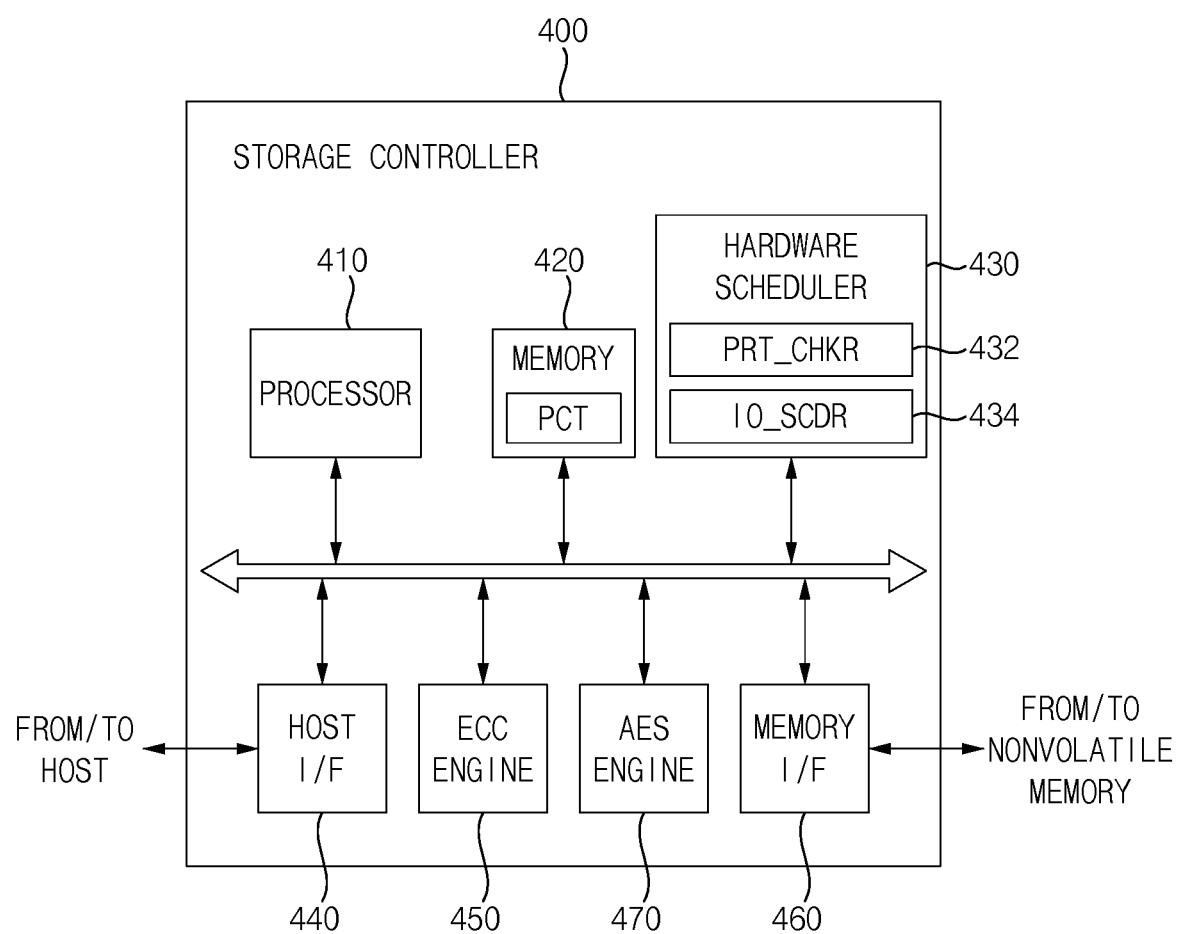
FIG. 3 is a block diagram illustrating an example of a storage controller included in a storage device according to example embodiments.

FIG. 3 is a block diagram illustrating an example of a storage controller included in a storage device according to example embodiments.

Referring to FIG. 3, a storage controller 400 may include a processor 410, a memory 420, a hardware scheduler 430, a host interface (I/F) 440, an error correction code (ECC) engine 450, a memory interface 460 and an advanced encryption standard (AES) engine 470.

The processor 410 may control an operation of the storage controller 400 in response to a request received via the host interface 440 from a host device (e.g., the host device 200 in FIG. 2). For example, the processor 410 may control an operation of a storage device (e.g., the storage device 300 in FIG. 2), and may control respective components of the storage device by employing firmware for operating the storage device.

The memory 420 may store instructions and data executed and processed by the processor 410. For example, the memory 420 may be implemented with a volatile memory, such as a DRAM, a SRAM, a cache memory, or the like. For example, a parameter check table PCT may be stored in the memory 420, and the parameter check table PCT may be substantially the same as the parameter check table 332 in FIG. 2.

The hardware scheduler 430 may be implemented to perform a method of operating a storage device according to example embodiments, and may be substantially the same as the hardware scheduler 312 in FIG. 2. The hardware scheduler 430 may include a parameter checker (PRT_CHKR) 432 and an I/O scheduler (IO_SCDR) 434. The parameter checker 432 may perform a parameter comparison operation using the parameter check table PCT. The I/O scheduler 434 may perform a scheduling operation based on the parameter comparison operation and may control timing of transmitting a data I/O command.

The ECC engine 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 440 may provide physical connections between the host device and the storage device. The host interface 440 may provide an interface corresponding to a bus format of the host device for communication between the host device and the storage device. In some example embodiments, the bus format of the host device may be a SCSI or a SAS interface. In other example embodiments, the bus format of the host device may be a USB, a PCIe, an ATA, a PATA, a SATA, an NVMe, a CXL, etc., format.

The memory interface 460 may exchange data with a nonvolatile memory (e.g., the nonvolatile memories 320a to 320c in FIG. 2). The memory interface 460 may transfer data to the nonvolatile memory, or may receive data read from the nonvolatile memory. In some example embodiments, the memory interface 460 may be connected to the nonvolatile memory via one channel. In other example embodiments, the memory interface 460 may be connected to the nonvolatile memory via two or more channels. For example, the memory interface 460 may be configured to comply with a standard protocol, such as Toggle or open NAND flash interface (ONFI).

The AES engine 470 may perform at least one of an encryption operation and a decryption operation on data input to the storage controller 400 by using a symmetric-key algorithm. The AES engine 470 may include an encryption module and a decryption module.

For example, the encryption module and the decryption module may be implemented as separate modules. As another example, one module capable of performing both encryption and decryption operations may be implemented in the AES engine 470.

The storage controller 400 may perform a function of a flash translation layer (FTL). FTL may perform several functions such as address mapping, wear-leveling, and garbage collection. An address mapping operation is an operation of changing a logical address received from the host device into a physical address used to actually store data in a storage device. For example, an address (e.g., a logical address) included in a data I/O request may be converted into a parameter (e.g., a physical address) included in an I/O job descriptor.

Figure 4:
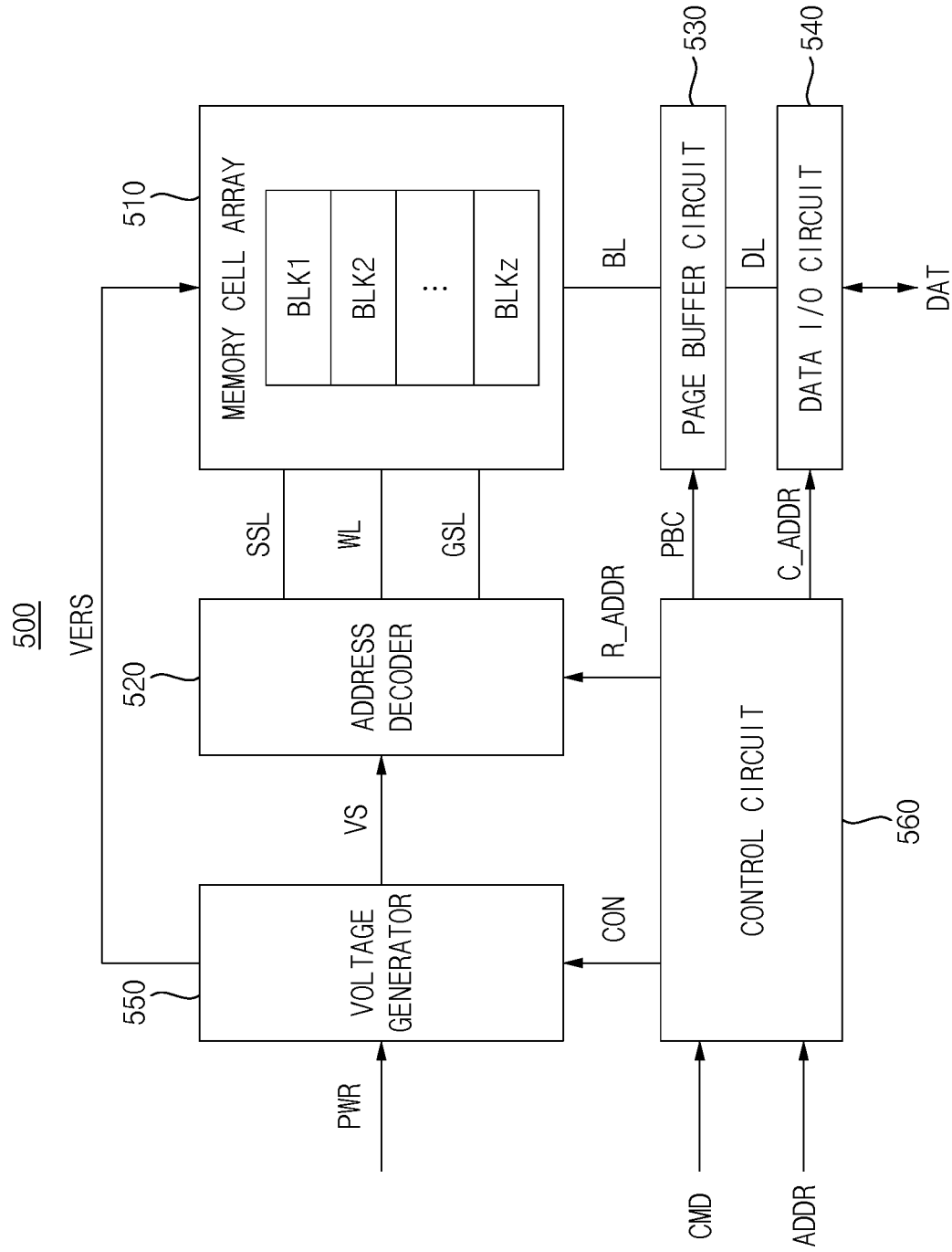
FIG. 4 is a block diagram illustrating an example of a non-volatile memory included in a storage device according to example embodiments.

FIG. 4 is a block diagram illustrating an example of a non-volatile memory included in a storage device according to example embodiments.

Referring to FIG. 4, a nonvolatile memory 500 may include a memory cell array 510, an address decoder 520, a page buffer circuit 530, a data I/O circuit 540, a voltage generator 550 and a control circuit 560.

The memory cell array 510 may be connected to the address decoder 520 via a plurality of string selection lines SSL, a plurality of wordlines WL and a plurality of ground selection lines GSL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In addition, each of the plurality of memory blocks BLK1 to BLKz may be divided into a plurality of pages.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may comprise a charge trap layer. The following patent documents, which are hereby incorporated by reference in their entireties, describe configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and U.S. Pat. Pub. No. 2011/0233648.

The control circuit 560 may receive a command CMD and an address ADDR from an outside (e.g., from the storage controller 310 in FIG. 2), and may control erasure, programming and read operations of the nonvolatile memory 500 based on the command CMD and the address ADDR received. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recovery read operation.

For example, the control circuit 560 may generate control signals CON, which are used for controlling the voltage generator 550, and may generate a control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL. For example, in the data erase/write/read operations, the address decoder 520 may determine at least one of the plurality of wordlines WL as a selected wordline, may determine at least one of the plurality of string selection lines SSL as a selected string selection line, and may determine at least one of the plurality of ground selection lines GSL as a selected ground selection line, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is required for the data erase operation based on the power PWR and the control signals CON. The erase voltage VERS may be applied to the memory cell array 510 directly or via the bitline BL.

The page buffer circuit 530 may be connected to the memory cell array 510 via the plurality of bitlines BL. The page buffer circuit 530 may include a plurality of page buffers. The page buffer circuit 530 may store data DAT to be programmed into the memory cell array 510 or may read data DAT sensed from the memory cell array 510. In other words, the page buffer circuit 530 may operate as a write driver or a sensing amplifier depending on an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR.

Figures 5A, 5B, 5C:
FIGS. 5A, 5B and 5C are diagrams illustrating examples of data I/O(I/O) requests, I/O job descriptors, and parameter check tables used in a method of operating a storage device according to example embodiments.

FIGS. 5A, 5B and 5C are diagrams illustrating examples of data I/O(I/O) requests, I/O job descriptors, and parameter check tables used in a method of operating a storage device according to example embodiments.

Referring to FIG. 5A, an example of a first data I/O request IO_REQ1a received from the host device 200 is illustrated.

The first data I/O request IO_REQ1a may be provided in a packet form and may include a plurality of fields. For example, among the plurality of fields included in the first data I/O request IO_REQ1a, an address field may include a first address LA1. For example, the first address LA1 may indicate a logical address of a first memory block that is a target of a first data I/O operation. Although not shown in detail, the first data I/O request IO_REQ1a may further include various fields for performing the first data I/O operation.

Referring to FIG. 5B, an example of a first I/O job descriptor IO_JD1a generated based on the first data I/O request IO_REQ1a is illustrated.

Similar to the first data I/O request IO_REQ1a, the first I/O job descriptor IO_JD1a may include a plurality of fields. For example, among the plurality of fields included in the first I/O job descriptor IO_JD1a, a parameter field may include a first parameter PT1. For example, the first parameter PT1 may correspond to the first address LA1 and may indicate the physical address of the first memory block. For example, the first parameter PT1 may be a physical block number (PBN) of the first memory block. Although not shown in detail, the first I/O job descriptor IO_JD1a may further include various fields for performing the first data I/O operation.

Referring to FIG. 5C, an example of a parameter check table 332a stored in the buffer memory 330 is illustrated.

The parameter check table 332a may include a plurality of parameters PTa, PTb, PTc, . . . . Similar to the first parameter PT1, each of the plurality of parameters PTa to PTc may indicate a physical address of a specific memory block. As described above, memory blocks corresponding to the plurality of parameters PTa to PTc included in the parameter check table 332a may be memory blocks in which the first operation (e.g., a reclaim operation) is being performed.

Figure 6A:
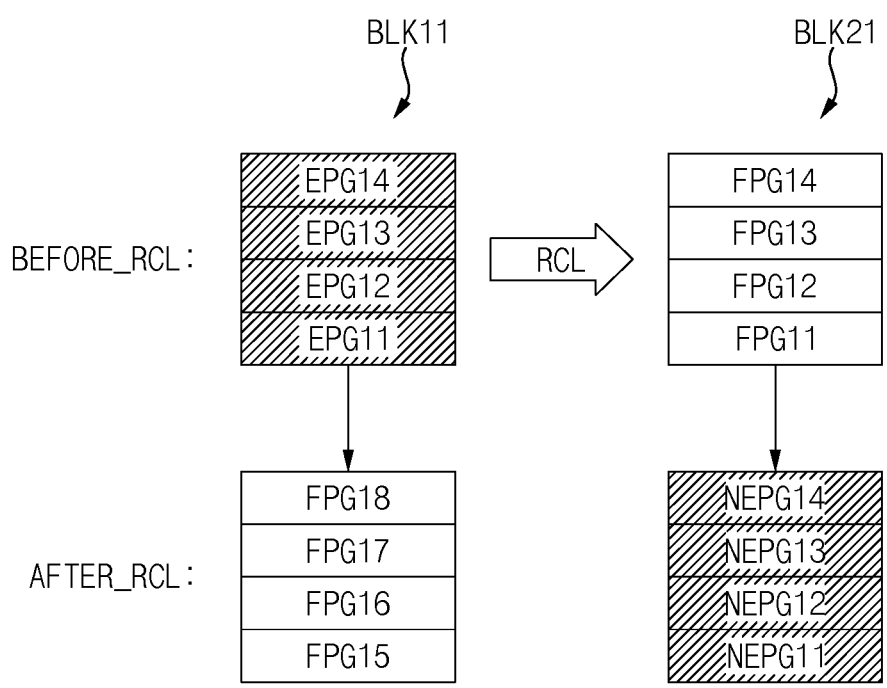

FIGS. 6A and 6B are diagrams illustrating examples of a first operation performed in a method of operating a storage device according to example embodiments.

Referring to FIG. 6A, a case in which the first operation is a block copy operation and also a reclaim operation RCL performed when an error occurs in data stored in a memory block is illustrated. In FIG. 6A, "BEFORE_RCL" indicates a data storage state of memory blocks before the reclaim operation RCL is performed, and "AFTER_RCL" indicates a data storage state of the memory blocks after the reclaim operation RCL is performed.

The storage device 300 may include memory blocks BLK11 and BLK21, and each memory block may include a plurality of pages. The memory blocks BLK11 and BLK21 may have the same size and include the same number of pages, and the plurality of pages may have the same size and include the same number of memory cells. Data write and read operations may be performed in units of pages, and a data erase operation may be performed in units of memory blocks.

Before the reclaim operation RCL is performed, the memory block BLK11 may be a used (e.g., data already written or stored) memory block, and the memory block BLK21 may be a free memory block. For example, the memory block BLK11 may include valid pages EPG11, EPG12, EPG13, and EPG14 on which an error has occurred, and the memory block BLK21 may include free pages FPG11, FPG12, FPG13, and FPG14. For example, the pages EPG11 to EPG14 may be error pages in which UECC has not occurred and data needs to be moved to another memory block due to degradation of cell state and/or data state.

As the reclaim operation RCL is performed, the memory block BLK11 may be changed to a free memory block by copying the pages EPG11 to EPG14 included in the memory block BLK11 to the memory block BLK21 and by performing a data erase operation on the memory block BLK11. For example, the reclaim operation RCL may be performed by the storage device 300 internally (e.g., under control of the storage controller 310).

As a result, after the reclaim operation RCL is performed, the memory block BLK11 may include free pages FPG15, FPG16, FPG17 and FPG18, and the memory block BLK21 may include valid pages NEPG11, NEPG12, NEPG13, and NEPG14 on which no error has occurred. For example, the pages NEPG11 to NEPG14 may be non-error pages. For example, data stored in the pages NEPG11 to NEPG14 may be substantially the same as data stored in the pages EPG11 to EPG14.

Referring to FIG. 6B, a case in which the first operation is a block copy operation and also a garbage collection operation GC performed to secure a free memory block is illustrated.

In FIG. 6B, "BEFORE_GC" indicates a data storage state of memory blocks before a garbage collection operation GC is performed, and "AFTER_GC" indicates a data storage state of memory blocks after a garbage collection operation (GC) is performed.

Before the garbage collection operation (GC) is performed, the memory blocks BLK12 and BLK22 may be used memory blocks, and the memory block BLK32 may be a free memory block. For example, the memory block BLK12 may include valid pages VPG21 and VPG22 and invalid pages IPG21 and IPG22, the memory block BLK22 may include valid pages VPG23 and VPG24 and invalid pages IPG23 and IPG24, and the memory block BLK32 may include free pages FPG21, FPG22, FPG23 and FPG24.

As garbage collection operations (GC) are performed, the memory blocks BLK12 and BLK22 may be changed to free memory blocks by copying the valid pages VPG21 to VPG24 included in the memory blocks BLK12 and BLK22 to the memory block BLK32 and by performing the data erase operation on the memory blocks BLK12 and BLK22. For example, the garbage collection operation (GC) may be performed by the storage device 300 internally (e.g., under control of the storage controller 310).

As a result, after the garbage collection operation (GC) is performed, the memory blocks BLK12 and BLK22 may include free pages FPG25, FPG26, FPG27, FPG28, FPG29, FPG2A, FPG2B, and FPG2C, and the memory block BLK32 may include the valid pages VPG21 to VPG24. Compared to before the garbage collection operation (GC) is performed, one free memory block may be added after the garbage collection operation (GC) is performed.

Figure 7:
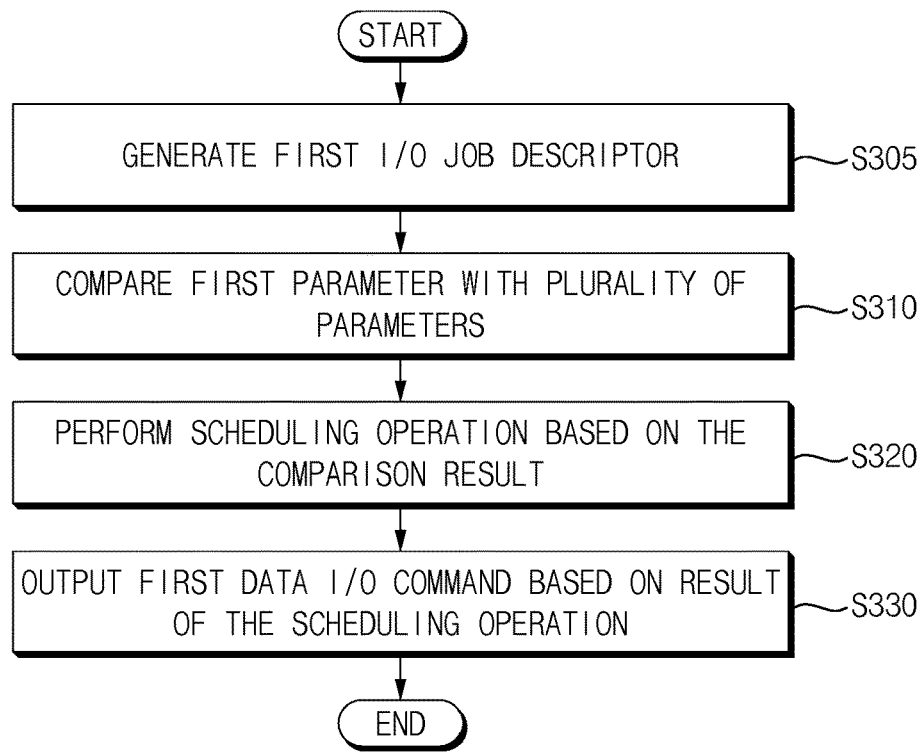
FIG. 7 is a flowchart illustrating an example of transmitting a first data I/O command in FIG. 1.

FIG. 7 is a flowchart illustrating an example of transmitting the first data I/O command in FIG. 1.

Referring to FIGS. 1 and 7, in transmitting the first data I/O command to at least one of the plurality of non-volatile memories (operation S300), a first I/O job descriptor including the first parameter may be generated based on the first data I/O request (operation S305). The first parameter included in the first I/O job descriptor may be compared with the plurality of parameters included in the parameter check table (operation S310). Based on a result of the comparison in operation S310, a scheduling operation for the first data I/O request may be performed (operation S320). Based on a result of the scheduling operation in operation S320, the first data I/O command corresponding to the first data I/O request may be output (operation S330). For example, a timing of outputting the first data I/O command may be adjusted so that the execution of the first data I/O request and the first data I/O operation may be delayed or maintained according to the result of the comparison and the scheduling operation.

Figure 8:
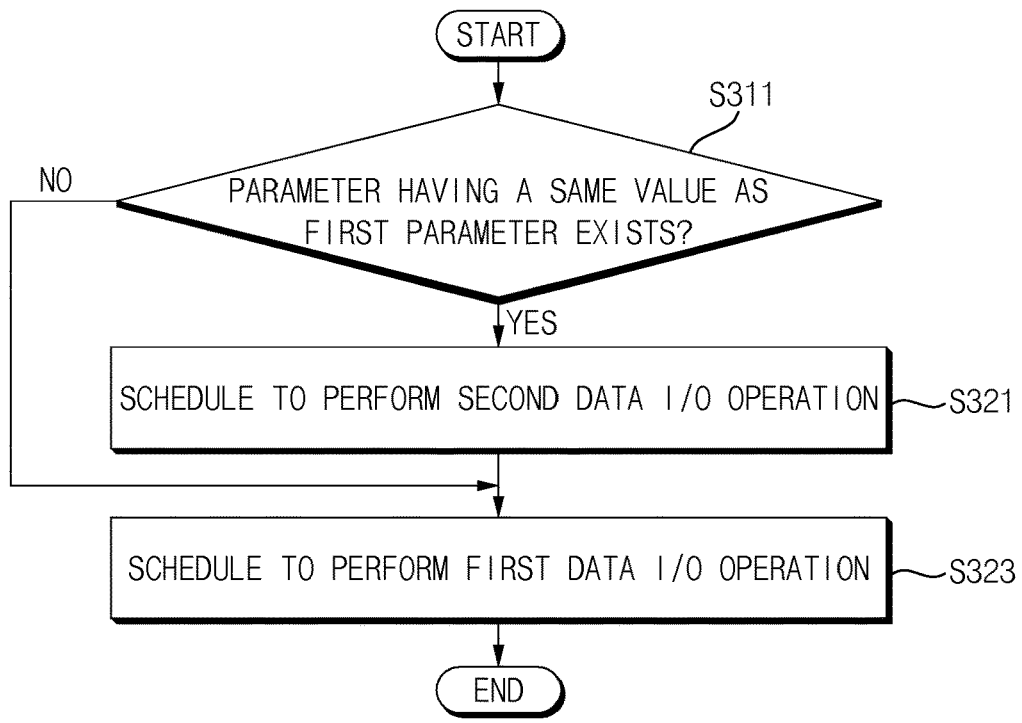
FIG. 8 is a flowchart illustrating an example of comparing a first parameter with a plurality of parameters in FIG. 7, and performing a scheduling operation in FIG. 7 based on a result of comparing a first parameter with a plurality of parameters.

FIG. 8 is a flowchart illustrating an example of comparing a first parameter with a plurality of parameters in FIG. 7, and performing a scheduling operation in FIG. 7 based on a result of comparing a first parameter with a plurality of parameters.

Referring to FIGS. 7 and 8, in comparing the first parameter and the plurality of parameters (operation S310), it may be checked whether a parameter having the same value as the first parameter exists among the plurality of parameters (operation S311).

When a parameter having the same value as the first parameter exists among the plurality of parameters (operation S311: Yes), since the first operation is being performed on the first memory block, the scheduling operation may be performed to delay the execution of the first data I/O request and the first data I/O operation. For example, in performing the scheduling operation (operation S320), a second data I/O operation different from the first data I/O operation may be scheduled to be performed before the first data I/O operation (operation S321). For example, the second data I/O operation may be performed on a second memory block different from the first memory block and may be performed based on a second data I/O request received after the first data I/O request. The first data I/O operation may be scheduled to be performed after the second data I/O operation is performed (operation S323).

If there is no parameter having the same value as the first parameter among the plurality of parameters (operation S311: No), since the first operation is not performed on the first memory block, the scheduling operation may be performed so that the first data I/O request and execution of the first data I/O operation are not delayed. For example, in performing the scheduling operation (operation S320), the first data I/O operation may be scheduled to be immediately performed without performing operation S321 (operation S323). FIGS. 9A, 9B, 10A, and 10B are diagrams describing operations in FIG. 8.

Figure 9A:
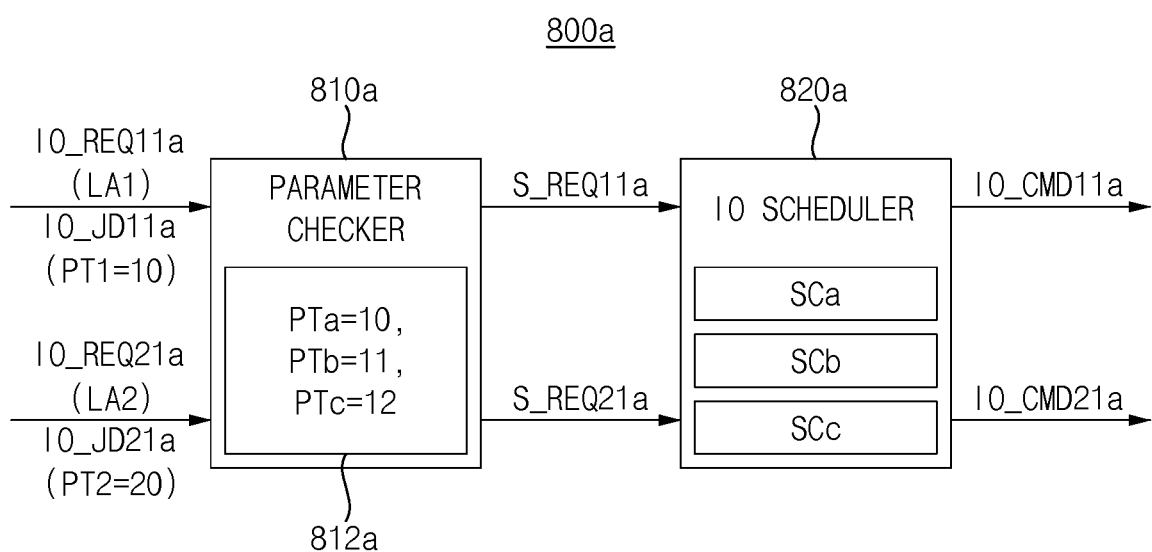
FIGS. 9A, 9B, 10A, and 10B are diagrams describing operations in FIG. 8.
Figure 9B:
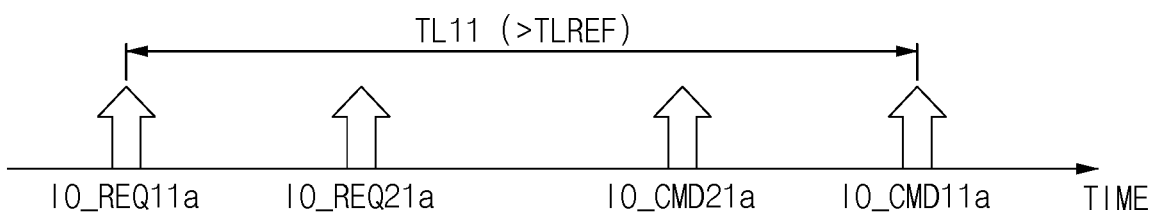

Referring to FIGS. 9A and 9B, a case in which the execution of the first data I/O request and the first data I/O operation is delayed in FIG. 8 is illustrated.

A hardware scheduler 800a may include a parameter checker 810a and an I/O scheduler 820a. The hardware scheduler 800a, the parameter checker 810a, and the I/O scheduler 820a may correspond to the hardware scheduler 430, the parameter checker 432, and the I/O scheduler 434 in FIG. 3, respectively.

The parameter checker 810a may perform a parameter comparison operation using a parameter check table 812a. For example, the plurality of parameters PTa to PTc included in the parameter check table 812a may have values of "10", "11", and "12", respectively.

The I/O scheduler 820a may perform a scheduling operation. For example, the I/O scheduler 820a may include sub-schedulers SCa, SCb, and SCc that perform scheduling on memory blocks corresponding to the plurality of parameters PTa to PTc.

In examples of FIGS. 9A and 9B, the parameter checker 810a may sequentially receive a first data I/O request IO_REQ11a and a second data I/O request IO_REQ21a, and may sequentially receive a first I/O job descriptor IO_JD11a and a second I/O job descriptor IO_JD21a corresponding to the first and second data I/O requests IO_REQ11a and IO_REQ21a. The first data I/O request IO_REQ11a may include the first address LA1, and the first I/O job descriptor IO_JD11a may include the first parameter PT1 corresponding to the first address LA1 and having a value of "10". The second data I/O request IO_REQ21a may include a second address LA2, and the second I/O job descriptor IO_JD21a may include a second parameter PT2 corresponding to the second address LA2 and having a value of "20". The parameter checker 810a may compare the first parameter PT1 with the plurality of parameters PTa to PTc, and may generate a first scheduling request S_REQ11a according to the comparison result. Since values of the first parameter PT1 and the parameter PTa are identical (i.e., the same), an execution of the first data I/O request IO_REQ11a may be controlled to be delayed.

Also, the parameter checker 810a may compare the second parameter PT2 with the plurality of parameters PTa to PTc, and generate a second scheduling request S_REQ21a according to the comparison result. Since a parameter having the same value as the second parameter PT2 does not exist in the parameter check table 812a, an execution of the second data I/O request IO_REQ21a may not be delayed, so that the second data I/O request IO_REQ21a may be controlled to be executed before the first data I/O request IO_REQ11a.

The I/O scheduler 820a may schedule the first and second data I/O requests IO_REQ11a and IO_REQ21a based on the first and second scheduling requests S_REQ11a and S_REQ21a, and may output a first and second data I/O commands IO_CMD11a and IO_CMD21a corresponding to the first and second data I/O requests IO_REQ11a and IO_REQ21a. Since the execution of the first data I/O request IO_REQ11a is delayed, the second data I/O command IO_CMD21a may be output before the first data I/O command IO_CMD11a. In other words, an output order of the first and second data I/O commands IO_CMD11a and IO_CMD21a may be different from a reception order of the first and second data I/O requests IO_REQ11a and IO_REQ21a. As the execution of the first data I/O request IO_REQ11a is delayed, a first latency TL11 from the reception time point of the first data I/O request IO_REQ11a to the output time point of the first data I/O command IO_CMD11a may be longer than a reference latency TLREF.

Figure 10A:
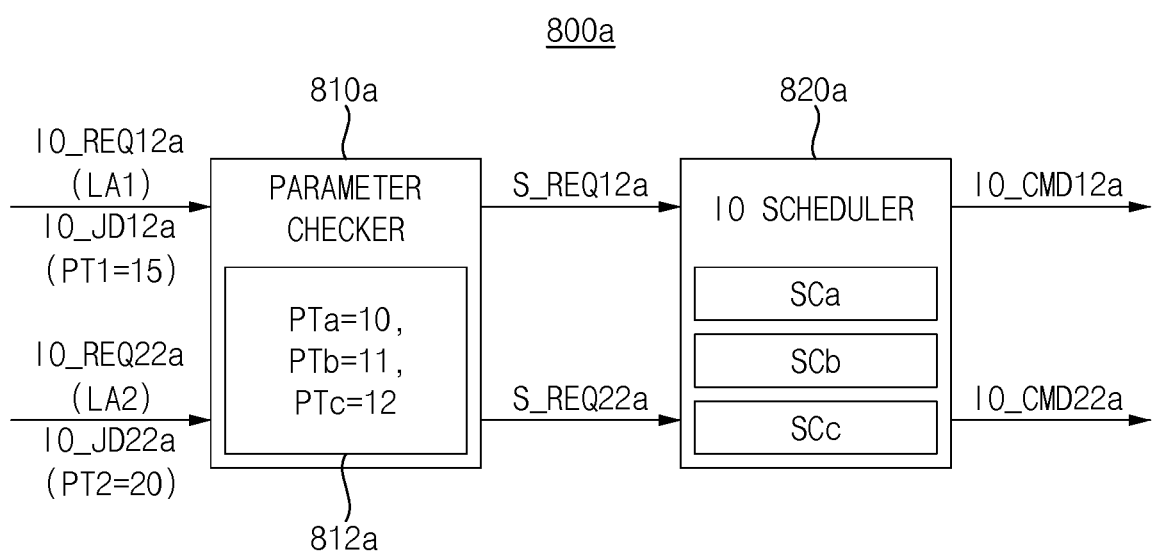
Figure 10B:
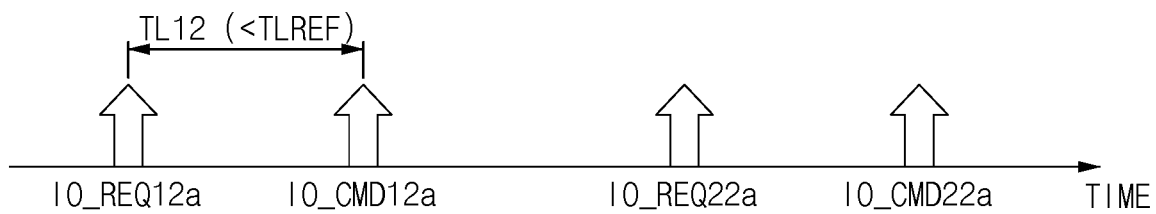

Referring to FIGS. 10A and 10B, a case in which the execution of the first data I/O request and the first data I/O operation is not delayed in FIG. 8 is illustrated. Descriptions repeated with those of FIGS. 9A and 9B will be omitted.

In examples of FIGS. 10A and 10B, the parameter checker 810a may sequentially receive a first data I/O request IO_REQ12a and a second data I/O request IO_REQ22a, and may receive a first I/O job descriptor IO_JD12a and a second I/O job descriptor IO_JD22a corresponding the first and second data I/O requests IO_REQ12a and IO_REQ22a. The first data I/O request IO_REQ12a may include the first address LA1, and the first I/O job descriptor IO_JD12a may include the first parameter PT1 corresponding to the first address LA and having a value of "15". The second data I/O request IO_REQ22a may include the second address LA2, and the second I/O job descriptor IO_JD22a may include the second parameter PT2 corresponding to the second address LA2 and having a value of "20".

The parameter checker 810a may compare the first and second parameters PT1 and PT2 with the plurality of parameters PTa to PTc, and may generate a first and second scheduling requests S_REQ12a and S_REQ22a according to the comparison result. The I/O scheduler 820a may schedule the first and second data I/O requests IO_REQ12a and IO_REQ22a based on the first and second scheduling requests S_REQ12a and S_REQ22a, and may output a first and second data I/O commands IO_CMD12a and IO_CMD22a corresponding to the first and second data I/O requests IO_REQ12a and IO_REQ22a. Since a parameter having the same value as the first and second parameters PT1 and PT2 does not exist in the parameter check table 812a, an execution of the first and second data I/O requests IO_REQ12a and IO_REQ22a is not delayed, and an output order of the first and second data I/O commands IO_CMD12a and IO_CMD22a may be the same as a reception order of the first and second data I/O requests IO_REQ12a and IO_REQ22a. As an execution of the first and second data I/O requests IO_REQ12a and IO_REQ22a is not delayed, a first latency TL12 from time point of receiving the first data I/O request IO_REQ12a to time point of outputting the first data I/O command IO_CMD12a may be longer than the reference latency TLREF.

FIGS. 11A, 11B, and 11C are diagrams illustrating examples of data I/O requests, I/O job descriptors, and parameter check tables used in a method of operating a storage device according to example embodiments. Descriptions repeated with those of FIGS. 5A, 5B and 5C will be omitted.

Referring to FIG. 11A, an example of a first data I/O request IO_REQ1b received from the host device 200 is illustrated.

For example, among the plurality of fields included in the first data I/O request IO_REQ1b, an address field may include the first address LA1, and a group ID information field may include first group ID information I1. For example, the first group ID information I1 may indicate information for generating a first scheduling group ID ID1 on a first scheduling group among a plurality of scheduling groups. In some example embodiments, the group ID information field may be omitted.

Referring to FIG. 11B, an example of the first I/O job descriptor IO_JD1b generated based on the first data I/O request IO_REQ1b is illustrated.

For example, among the plurality of fields included in the first I/O job descriptor IO_JD1b, and the parameter field may include the first parameter PT1, and the scheduling group ID field may include the first scheduling group ID ID1. For example, the first scheduling group ID ID1 may correspond to the first group ID information I1 and may indicate a first scheduling group among a plurality of scheduling groups. For example, each of the plurality of scheduling groups may represent a specific user and/or specific task.

In some example embodiments, some of the plurality of scheduling groups may correspond to different users using the storage device through the host device, Other parts of the plurality of scheduling groups may correspond to tasks independently performed by the storage device regardless of the host device.

In some example embodiments, each of the plurality of scheduling groups may be set to process data I/O requests with predetermined performance.

It has been described that the first scheduling group ID ID1 of the first I/O job descriptor IO_JD1b is generated based on the first group ID information I1 included in the first data I/O request IO_REQ1b, but example embodiments are not limited thereto. In some example embodiments, the first data I/O request IO_REQ1b may not include the first group ID information I1, and the storage controller may internally generate/apply the first scheduling group ID ID1.

Referring to FIG. 11C, an example of the parameter check table 332b stored in the buffer memory 330 is illustrated.

The parameter check table 332a may include the plurality of parameters PTa to PTc, and may include a plurality of source scheduling group IDs S_IDa, S_Idb and S_IDc and a plurality of destination scheduling group IDs D_IDa, D_Idb and D_IDc corresponding to the plurality of parameters PTa to PTc. Similar to the first scheduling group ID ID1, each of the plurality of source scheduling group IDs S_Ida to S_IDc and the plurality of destination scheduling group IDs D_Ida to D_IDc may indicate a specific scheduling group. For example, when parameters match, a scheduling request may be redirected from a source scheduling group to a destination scheduling group.

Figure 12:
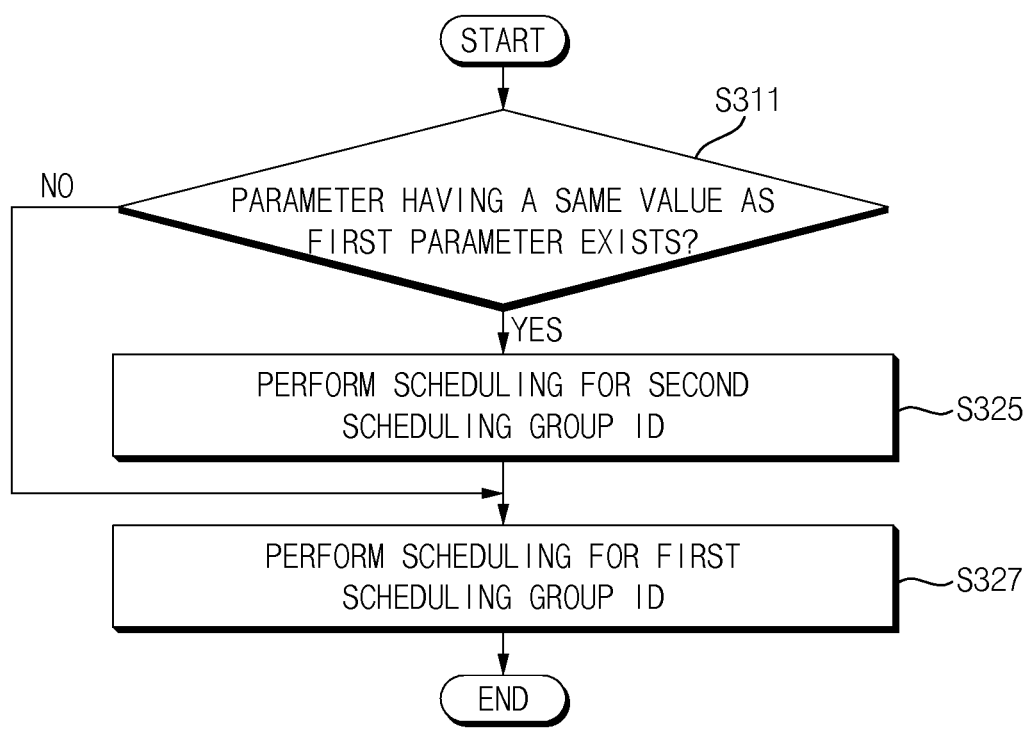
FIG. 12 is a flowchart illustrating an example of comparing a first parameter with a plurality of parameters in FIG. 7, and performing a scheduling operation in FIG. 7 based on a result of comparing a first parameter with a plurality of parameters.

FIG. 12 is a flowchart illustrating an example of comparing a first parameter with a plurality of parameters in FIG. 7, and performing a scheduling operation in FIG. 7 based on a result of comparing a first parameter with a plurality of parameters. Descriptions repeated with those of FIG. 8 will be omitted.

Referring to FIGS. 7 and 12, in comparing the first parameter and the plurality of parameters (operation S310), operation S311 may be substantially the same as that described above with reference to FIG. 8.

When a second parameter having the same value as the first parameter exists among the plurality of parameters (operation S311: Yes), a scheduling operation may be performed to delay an execution of the first data I/O request and the first data I/O operation. For example, in performing the scheduling operation (operation S320), scheduling for a second scheduling group ID corresponding to a destination scheduling group ID of the second parameter may be performed before scheduling for a first scheduling group ID (operation S325). By requesting scheduling using a scheduling group ID other than the first scheduling group ID included in the first data I/O request, the execution of the first data I/O request may be delayed. After performing scheduling for the second scheduling group ID, scheduling for the first scheduling group ID may be performed (operation S327).

If there is no parameter having the same value as the first parameter among the plurality of parameters (operation S311: No), the scheduling operation may be performed so that the execution of the first data I/O request and the first data I/O operation are not delayed. For example, in performing the scheduling operation (operation S320), scheduling for the first scheduling group ID may be immediately performed without performing operation S325 (operation S327).

Figure 13A:
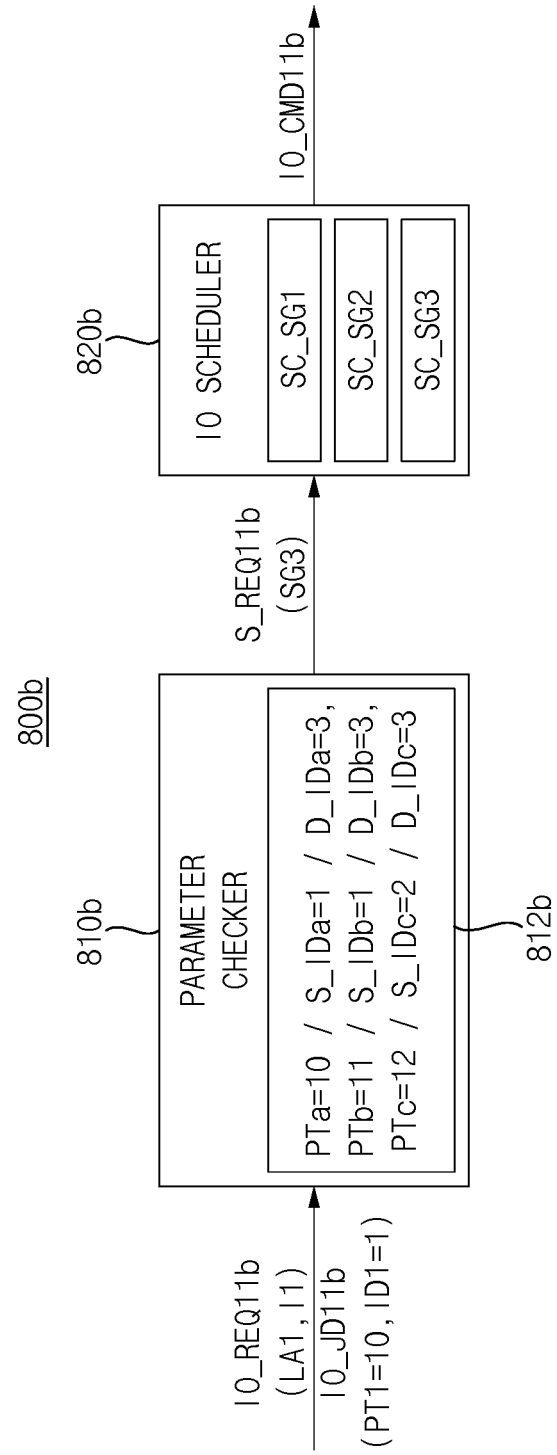
FIGS. 13A and 13B are diagrams describing operations in FIG. 12.
Figure 13B:
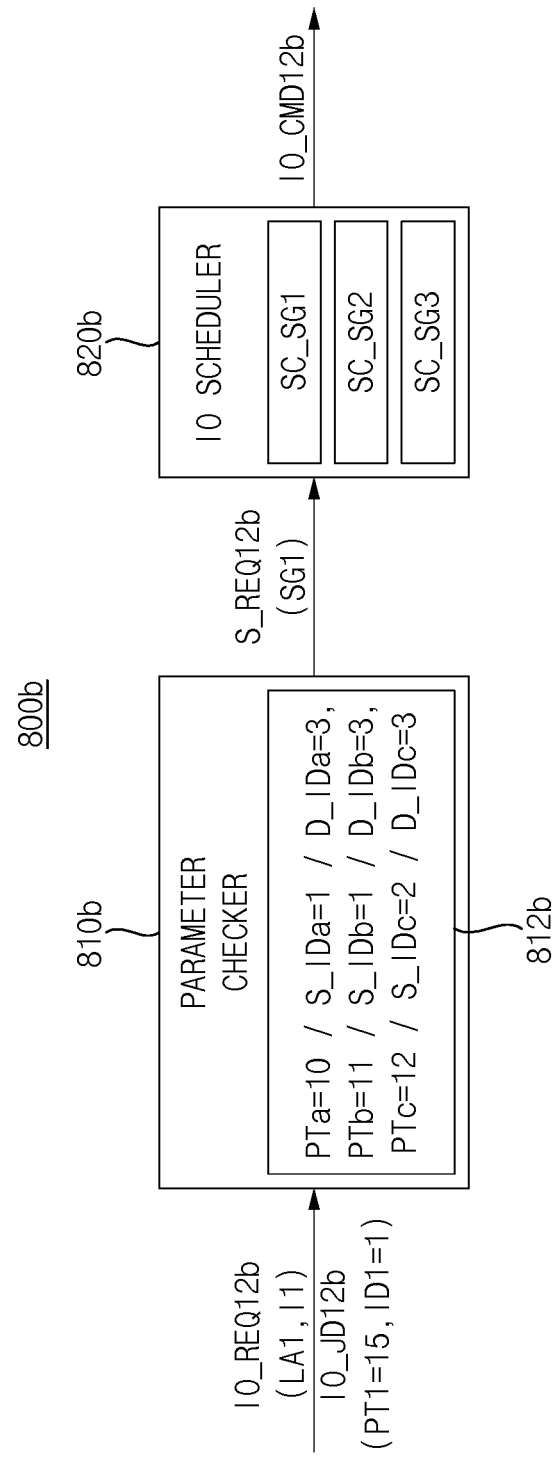

FIGS. 13A and 13B are diagrams describing operations in FIG. 12. Descriptions repeated with those of FIGS. 9A, 9B, 10A and 10B will be omitted.

Referring to FIG. 13A, FIG. 12 illustrates a case in which delaying the first data I/O request and the execution of the first data I/O operation.

A hardware scheduler 800b may include a parameter checker 810b and an I/O scheduler 820b.

The parameter checker 810b may perform a parameter comparison operation using a parameter check table 812b. For example, the plurality of parameters PTa to PTc included in the parameter check table 812b may have values of "10", "11", and "12", respectively, the plurality of source scheduling group IDs S_Ida to S_IDc may have values of "1", "1", and "2", respectively, and the plurality of destination scheduling group IDs D_IDa to D_IDc may have values of "3", "3", and "3", respectively.

The I/O scheduler 820b may perform a scheduling operation. For example, the I/O scheduler 820b may include sub-schedulers SC_SG1, SC_SG2 and SC_SG3 that performs scheduling on scheduling groups SG1, SG2, and SG3 corresponding to scheduling group IDs having values of "1", "2", and "3".

In examples of FIG. 13A, the parameter checker 810b may receive a first data I/O request IO_REQ11b and may receive a first I/O job descriptor IO_JD11b corresponding to the first data I/O request IO_REQ11b. The first data I/O request IO_REQ11b may include the first address LA1 and first group ID information I1, and the first I/O job descriptor IO_JD11b may include the first parameter PT1 corresponding to the first address LA1 and having a value of "10" and the first scheduling group ID ID1 corresponding to the first group ID information I1 and having a value of "1". The parameter checker 810b may compare the first parameter PT1 with the plurality of parameters PTa to PTc, and may generate a first scheduling request S_REQ11b according to the comparison result. Since values of the first parameter PT1 and the parameter PTa are identical, an execution of the first data I/O request IO_REQ11b may be controlled to be delayed, and scheduling for the scheduling group SG3 corresponding to "3", which is a value of the destination scheduling group ID D_IDa included in the parameter PTa, may be controlled to be performed before scheduling for the scheduling group SG1.

The I/O scheduler 820b performs scheduling for the scheduling group SG3 based on the first scheduling request S_REQ11b before scheduling for the scheduling group SG1 corresponding to a value of "1" of the first scheduling group ID ID1, and may output a first data I/O command IO_CMD11b corresponding to the first data I/O request IO_REQ11b. As described above with reference to FIG. 9B, as the execution of the first data I/O request (IO_REQ11b) is delayed, a first latency from reception of the first data I/O request IO_REQ11b to output of the first data I/O command IO_CMD11b may be longer than the reference latency TLREF.

Referring to FIG. 13B, FIG. 12 illustrates a case in which the execution of the first data I/O request and the first data I/O operation is not delayed. Descriptions repeated with those of FIG. 13A will be omitted.

In examples of FIG. 13B, the parameter checker 810b may receive a first data I/O request IO_REQ12b, and may receive a first I/O job descriptor IO_JD12b corresponding to the first data I/O request IO_REQ12b. The first data I/O request IO_REQ12b may include the first address LA1 and first group ID information I1, and the first I/O job descriptor IO_JD12b may include the first parameter PT1 corresponding to the first address LA1 and having a value of "15" and the first scheduling group ID ID1 corresponding to the first group ID information I1 and having a value of "1". The parameter checker 810b may compare the first parameter PT1 with the plurality of parameters PTa to PTc, and may generate a first scheduling request S_REQ12b according to the comparison result. Since the parameter having the same value as the first parameter PT1 does not exist in the parameter check table 812b, an execution of the first data I/O request IO_REQ12b is not delayed, scheduling for the scheduling group SG1 corresponding to a value of "1" of the first scheduling group ID ID1 may be controlled to be performed immediately. The I/O scheduler 820b may immediately perform scheduling for the scheduling group SG1 based on the first scheduling request S_REQ12b, and may output a first data I/O command IO_CMD12b corresponding to the first data I/O request IO_REQ12b. As described above with reference to FIG. 10B, as the execution of the first data I/O request IO_REQ12b is not delayed, a first latency from reception of the first data I/O request IO_REQ12b to output of the first data I/O command IO_CMD12b may be shorter than the reference latency TLREF.

Figure 14:
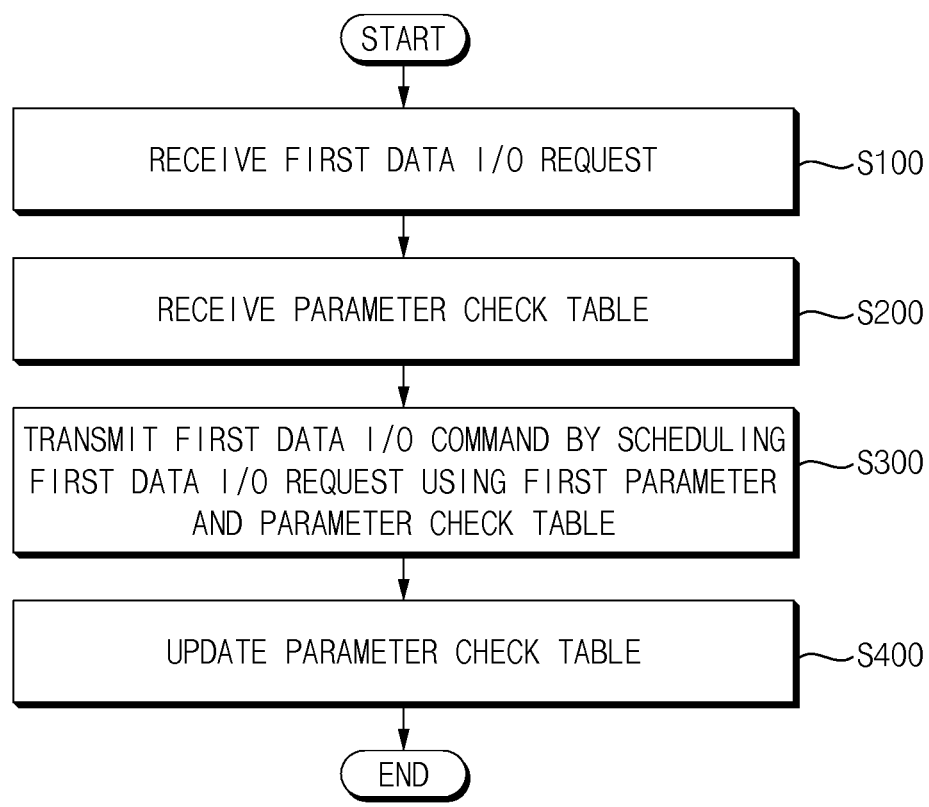
FIG. 14 is a flowchart illustrating a method of operating a storage device according to example embodiments.

FIG. 14 is a flowchart illustrating a method of operating a storage device according to example embodiments. Descriptions repeated with those of FIG. 1 will be omitted.

Referring to FIG. 14, in a method of operating a storage device according to example embodiments, operations S100, S200, and S300 may be substantially the same as those described above with reference to FIG. 1.

The parameter check table may be updated (operation S400). For example, operation S400 may be performed in real time while operating the storage device.

Figure 15A:
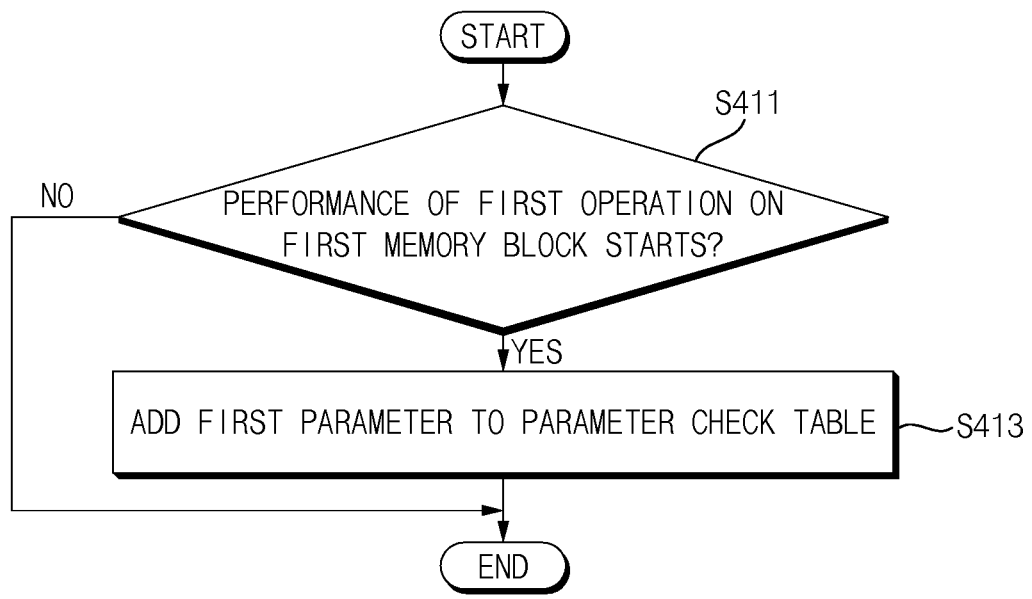
FIGS. 15A and 15B are flowcharts illustrating examples of updating a parameter check table in FIG. 14.
Figure 15B:
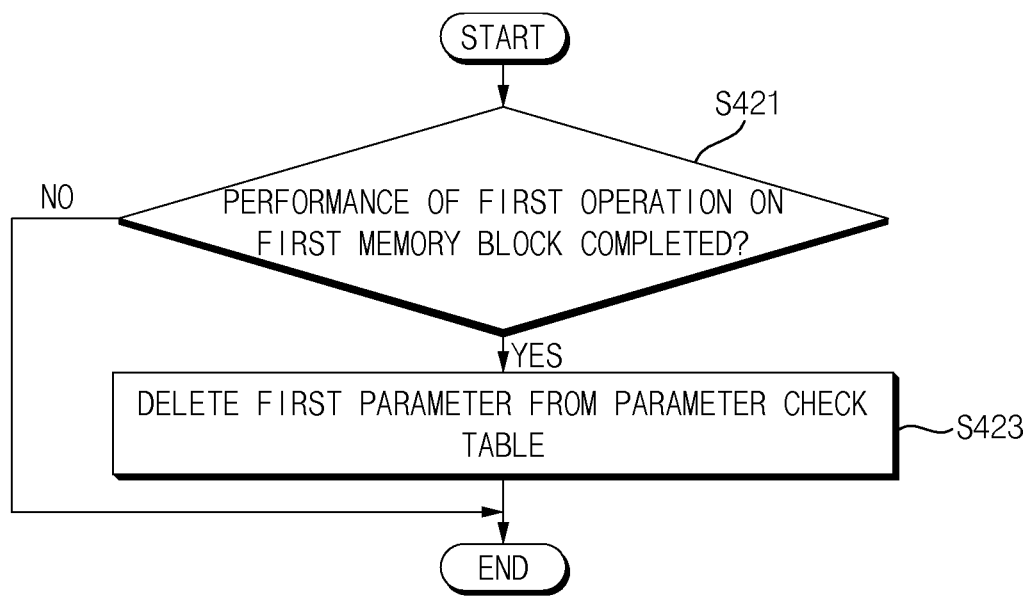

FIGS. 15A and 15B are flowcharts illustrating examples of updating a parameter check table in FIG. 14.

Referring to FIGS. 14 and 15A, in updating the parameter check table (operation S400), when performing the first operation on the first memory block is triggered (operation S411: Yes), the parameter check table may be updated to add the first parameter to the parameter check table (operation S413). For example, a trigger of the first operation may be detected in real time.

Referring to FIGS. 14 and 15B, in updating the parameter check table (operation S400), when the first operation on the first memory block is completed (operation S421: Yes), the parameter check table may be updated to delete the first parameter included in the parameter check table (operation S423). For example, a trigger of the first operation may be detected in real time. For example, an end of the first operation may be detected in real time.

In some example embodiments, the parameter check table may be updated by combining operations in FIGS. 15A and 15B.

Meanwhile, example embodiments may be implemented in a form of a product including a computer readable program code stored in a computer readable medium. The computer readable program code may be provided to processors of various computers or other data processing devices. The computer-readable medium may be a computer-readable signal medium or a computer-readable recording medium. The computer-readable recording medium may be any tangible medium capable of storing or including a program in or connected to an instruction execution system, equipment, or device. For example, the computer-readable medium may be provided in the form of a non-transitory storage medium. Herein, non-transitory means that the storage medium does not contain a signal and is tangible, but does not distinguish whether data is stored semi-permanently or temporarily in the storage medium.

Figure 16:
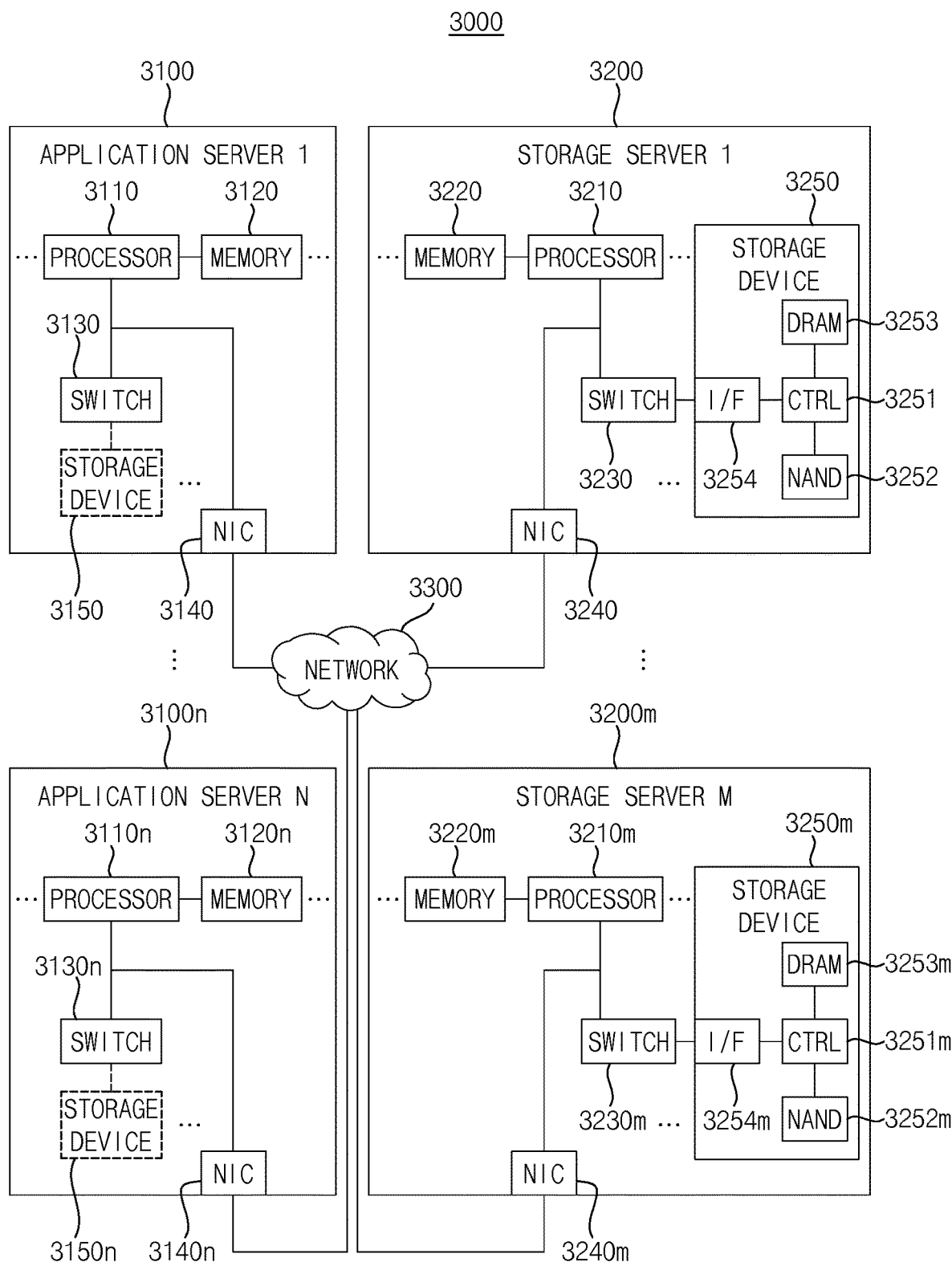
FIG. 16 is a block diagram illustrating a data center including a storage device according to example embodiments.

FIG. 16 is a block diagram illustrating a data center including a storage device according to example embodiments.

Referring to FIG. 16, a data center 3000 may be a facility that collects various types of data and provides various services, and may be referred to as a data storage center. The data center 3000 may be a system for operating search engines and databases, and may be a computing system used by companies such as banks or government agencies. The data center 3000 may include application servers 3100 to 3100n and storage servers 3200 to 3200m. The number of the application servers 3100 to 3100n and the number of the storage servers 3200 to 3200m may be variously selected according to example embodiments, and the number of the application servers 3100 to 3100n and the number of the storage servers 3200 to 3200m may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operations of the storage server 3200, and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors 3210 and the number of the memories 3220 included in the storage server 3200 may be variously selected according to example embodiments. In some example embodiments, the processor 3210 and the memory 3220 may provide a processor-memory pair. In some example embodiments, the number of the processors 3210 and the number of the memories 3220 may be different from each other. The processor 3210 may include a single core processor or a multiple core processor. The above description of the storage server 3200 may be similarly applied to the application server 3100. The application server 3100 may include at least one storage device 3150, and the storage server 3200 may include at least one storage device 3250. In some example embodiments, the application server 3100 may not include the storage device 3150. The number of the storage devices 3250 included in the storage server 3200 may be variously selected according to example embodiments.

The application servers 3100 to 3100n and the storage servers 3200 to 3200m may communicate with each other through a network 3300. The network 3300 may be implemented using a fiber channel (FC) or an Ethernet. The FC may be a medium used for a relatively high speed data transmission, and an optical switch that provides high performance and/or high availability may be used. The storage servers 3200 to 3200m may be provided as file storages, block storages or object storages according to an access scheme of the network 3300.

In some example embodiments, the network 3300 may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In other example embodiments, the network 3300 may be a general or normal network such as the TCP/IP network. For example, the network 3300 may be implemented according to at least one of protocols such as an FC over Ethernet (FCOE), a network attached storage (NAS), a nonvolatile memory express (NVMe) over Fabrics (NVMe-oF), etc.

Hereinafter, example embodiments will be described based on the application server 3100 and the storage server 3200. The description of the application server 3100 may be applied to the other application server 3100n, and the description of the storage server 3200 may be applied to the other storage server 3200m.

The application server 3100 may store data requested to be stored by a user or a client into one of the storage servers 3200 to 3200m through the network 3300. In addition, the application server 3100 may obtain data requested to be read by the user or the client from one of the storage servers 3200 to 3200m through the network 3300. For example, the application server 3100 may be implemented as a web server or a database management system (DBMS).

The application server 3100 may access a memory 3120n or a storage device 3150n included in the other application server 3100n through the network 3300, and/or may access the memories 3220 to 3220m or the storage devices 3250 to 3250m included in the storage servers 3200 to 3200m through the network 3300. Thus, the application server 3100 may perform various operations on data stored in the application servers 3100 to 3100n and/or the storage servers 3200 to 3200m. For example, the application server 3100 may execute a command for moving or copying data between the application servers 3100 to 3100n and/or the storage servers 3200 to 3200m. The data may be transferred from the storage devices 3250 to 3250m of the storage servers 3200 to 3200m to the memories 3120 to 3120n of the application servers 3100 to 3100n directly or through the memories 3220 to 3220m of the storage servers 3200 to 3200m. For example, the data transferred through the network 3300 may be encrypted data for security or privacy.

In the storage server 3200, an interface 3254 may provide a physical connection between the processor 3210 and a controller 3251 and/or a physical connection between a network interface card (NIC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, a compute express link (CXL), an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230 and the NIC 3240. The switch 3230 may selectively connect the processor 3210 with the storage device 3250 or may selectively connect the NIC 3240 with the storage device 3250 under a control of the processor 3210. Similarly, the application server 3100 may further include a switch 3130 and an NIC 3140.

In some example embodiments, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230 and the storage device 3250.

In the storage servers 3200 to 3200m and/or the application servers 3100 to 3100n, the processor may transmit a command to the storage devices 3150 to 3150n and 3250 to 3250m or the memories 3120 to 3120n and 3220 to 3220m to program or read data. For example, the data may be error-corrected data by an error correction code (ECC) engine. For example, the data may be processed by a data bus inversion (DBI) or a data masking (DM), and may include a cyclic redundancy code (CRC) information. For example, the data may be encrypted data for security or privacy.

The storage devices 3150 to 3150m and 3250 to 3250m may transmit a control signal and command/address signals to NAND flash memory devices 3252 to 3252m in response to a read command received from the processor. When data is read from the NAND flash memory devices 3252 to 3252m, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control overall operations of the storage device 3250. In some example embodiments, the controller 3251 may include a static random access memory (SRAM). The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210m in the other storage server 3200m, or the processors 3110 to 3110n in the application servers 3100 to 3100n. A DRAM 3253 may temporarily store (e.g., may buffer) data to be written to the NAND flash memory device 3252 or data read from the NAND flash memory device 3252. Further, the DRAM 3253 may store meta data. The meta data may be data generated by the controller 3251 to manage user data or the NAND flash memory device 3252.

Each of the storage devices 3250 to 3250m may be the storage device according to example embodiments, and may perform a method of operating a storage device according to example embodiments.

Aspects of the inventive concept may be applied to various electronic devices and systems that include the storage devices and the storage systems. For example, aspects of the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating a storage device including a plurality of non-volatile memories and a buffer memory, the method comprising:
    receiving a first data input/output (I/O) request for performing a first data I/O operation from a host device located outside the storage device, the first data I/O request including an address of a first memory block among a plurality of memory blocks included in the plurality of non-volatile memories, the first data I/O operation being performed on the first memory block;
    receiving a parameter check table including a plurality of parameters from the buffer memory; and
    transmitting a first data I/O command to at least one of the plurality of non-volatile memories by scheduling the first data I/O request using a first parameter and the parameter check table, the first data I/O command corresponding to the first data I/O request, the first parameter corresponding to the address of the first memory block,
    wherein transmitting the first data I/O command includes:
    generating, based on the first data I/O request, a first I/O job descriptor including the first parameter and a first scheduling group identification (ID) indicating a first scheduling group among a plurality of scheduling groups, and
    wherein, when the first parameter of the first I/O job descriptor is equal to one of the plurality of parameters of the parameter check table, a timing of transmitting the first data I/O command is controlled such that a first latency from a time at which the first data I/O request is received to a time at which the first data I/O command is transmitted becomes longer than a reference latency.

2. The method of claim 1,
    wherein, when the first parameter is equal to one of the plurality of parameters included in the parameter check table, a first operation is being performed on the first memory block.

3. The method of claim 2,
    wherein the first operation is an operation in which at least a part of first data stored in the first memory block is copied to a second memory block different from the first memory block among the plurality of memory blocks.

4. The method of claim 3,
    wherein the first operation is performed when an error occurs in the first memory block or is performed to change the first memory block into a free memory block.

5. The method of claim 2,
    wherein, during the first operation being performed on the first memory block, execution of the first data I/O operation on the first memory block is delayed.

6. The method of claim 5,
    wherein the first data I/O operation is a data read operation in which at least a part of first data stored in the first memory block is read.

7. The method of claim 6, wherein the first data I/O operation is performed when a read count threshold value of the first memory block is greater than zero.

8. The method of claim 2, further comprising:
    when performing the first operation starts, updating the parameter check table to add the first parameter to the parameter check table.

9. The method of claim 8, further comprising:
    when performing the first operation is completed, updating the parameter check table to delete the first parameter from the parameter check table.

10. The method of claim 1, wherein transmitting the first data I/O command further includes:
    comparing the first parameter with the plurality of parameters;
    performing a scheduling operation based on a result of comparing the first parameter with the plurality of parameters; and
    outputting the first data I/O command based on a result of the scheduling operation.

11. The method of claim 10, wherein performing the scheduling operation includes:
    when a parameter having the same value as the first parameter exists in the plurality of parameters, scheduling a second data I/O operation different from the first data I/O operation to be performed before the first data I/O operation is performed; and
    when the parameter having the same value as the first parameter does not exist in the plurality of parameters, scheduling the first data I/O operation to be immediately performed.

12. The method of claim 10,
    wherein the parameter check table further includes a plurality of source scheduling group IDs corresponding to the plurality of parameters and a plurality of destination scheduling group IDs corresponding to the plurality of parameters.

13. The method of claim 12, wherein performing the scheduling operation includes:

when a second parameter among the plurality of parameters has the same value as the first parameter, performing a scheduling operation on a second scheduling group ID corresponding to a destination scheduling group ID of the second parameter before a scheduling operation is performed on the first scheduling group ID; and when a parameter having the same value as the first parameter does not exist in the plurality of parameters, performing the scheduling operation on the first scheduling group ID immediately.

14. The method of claim 12,
wherein first parts of the plurality of scheduling groups correspond to different users using the storage device through the host device, and
wherein second parts of the plurality of scheduling groups correspond to jobs performed by the storage device regardless of the host device.

15. The method of claim 12, wherein each of the plurality of scheduling groups is configured to process data I/O requests with predetermined performance.

16. The method of claim 1, wherein, when the first parameter is different from all of the plurality of parameters included in the parameter check table, the timing of transmitting the first data I/O command is controlled such that the first latency becomes shorter than the reference latency.

17. The method of claim 1,
wherein the address of the first memory block included in the first data I/O request is a logical address, and
wherein the first parameter is a physical address of the first memory block.

18. A storage device comprising:
a storage controller;
a plurality of non-volatile memories controlled by the storage controller, and including a plurality of memory blocks; and
a buffer memory controlled by the storage controller, and configured to store a parameter check table including a plurality of parameters,
wherein the storage controller is configured to:
receive a first data input/output (I/O) request for performing a first data I/O operation from a host device located outside the storage device, the first data I/O request including an address of a first memory block among the plurality of memory blocks, the first data I/O operation being performed on the first memory block;
receive the parameter check table from the buffer memory;
transmit a first data I/O command to at least one of the plurality of non-volatile memories by scheduling the first data I/O request using a first parameter and the parameter check table, the first data I/O command corresponding to the first data I/O request, the first parameter corresponding to the address of the first memory block; and
when the first parameter is equal to one of the plurality of parameters included in the parameter check table, control a timing of transmitting the first data I/O command such that a first latency from a time at which the first data I/O request is received to a time at which the first data I/O command is transmitted becomes longer than a reference latency,
wherein the storage controller is configured further to generate, in the transmitting of the first data I/O command, a first I/O job descriptor based on the first data I/O request, and wherein the first I/O job descriptor includes the first parameter and a first scheduling group identification (ID) indicating a first scheduling group among a plurality of scheduling groups.

19. The storage device of claim 18,
wherein the buffer memory is included in the storage controller.

20. A method of operating a storage device including a storage controller, a plurality of non-volatile memories and a buffer memory, and communicating with a host device located outside the storage device, the method comprising:
receiving, by the storage controller, a first data read request for performing a first data read operation from the host device, the first data read operation being performed on a first memory block among a plurality of memory blocks included in the plurality of non-volatile memories;
receiving, by the storage controller, a parameter check table from the buffer memory; and
transmitting, by the storage controller, a first data read command to at least one of the plurality of non-volatile memories by scheduling the first data read request using the parameter check table, the first data read command corresponding to the first data read request,
wherein the first data read request includes a logical address of the first memory block,
wherein a first read job descriptor generated based on the first data read request includes a first parameter corresponding to a physical block number (PBN) of the first memory block, and a first scheduling group identification (ID) corresponding to a first scheduling group among a plurality of scheduling groups,
wherein the parameter check table includes a plurality of parameters, a plurality of source scheduling group IDs corresponding to the plurality of parameters and a plurality of destination scheduling group IDs corresponding to the plurality of parameters,
wherein transmitting the first data read command includes:
generating the first read job descriptor based on the first data read request;
comparing the first parameter included in the first read job descriptor with the plurality of parameters included in the parameter check table;
when a second parameter among the plurality of parameters has the same value as the first parameter, performing a scheduling operation on a second scheduling group ID corresponding to a destination scheduling group ID of the second parameter before a scheduling operation is performed on the first scheduling group ID;
when a parameter having the same value as the first parameter does not exist in the plurality of parameters, performing the scheduling operation on the first scheduling group ID immediately; and
outputting the first data read command based on a result of the scheduling operations,
wherein, when the second parameter has the same value as the first parameter, an operation in which at least a part of first data stored in the first memory block is copied to a second memory block different from the first memory block among the plurality of memory blocks is being performed, and
wherein, when the second parameter has the same value as the first parameter, a timing of transmitting the first data read command is controlled such that execution of the first data read operation on the first memory block is delayed, and the timing of transmitting the first data read command is controlled such that a first latency from a time at which the first data read request is received to a time at which the first data read command is transmitted becomes longer than a reference latency.

* * * * *